US012645454B2

(12) United States Patent
Hughes et al.

(10) Patent No.: US 12,645,454 B2
(45) Date of Patent: Jun. 2, 2026

(54) SHARED PREFETCH INSTRUCTION AND SUPPORT

(71) Applicant: Intel Corporation, Santa Clara, CA (US)

(72) Inventors: Christopher Hughes, Santa Clara, CA (US); Zhe Wang, San Jose, CA (US); Dan Baum, Haifa (IL); Alexander Heinecke, San Jose, CA (US); Evangelos Georganas, San Jose, CA (US); Lingxiang Xiang, Santa Clara, CA (US); Joseph Nuzman, Haifa (IL); Ritu Gupta, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 17/485,372

(22) Filed: Sep. 25, 2021

(65) Prior Publication Data

US 2023/0101512 A1     Mar. 30, 2023

(51) Int. Cl.
*G06F 9/30*          (2018.01)
*G06F 12/0811*      (2016.01)
*G06F 12/0862*      (2016.01)

(52) U.S. Cl.
CPC ...... *G06F 9/30047* (2013.01); *G06F 9/30101* (2013.01); *G06F 9/30196* (2013.01); *G06F 12/0811* (2013.01); *G06F 12/0862* (2013.01); *G06F 2212/6028* (2013.01)

(58) Field of Classification Search
CPC ............. G06F 9/30047; G06F 9/30101; G06F 9/30196; G06F 12/0811; G06F 12/0862; G06F 2212/6028
See application file for complete search history.

(56) References Cited

U.S. PATENT DOCUMENTS

| | | | |
|---|---|---|---|
| 5,960,461 A | | 9/1999 | Frank et al. |
| 6,076,156 A | * | 6/2000 | Pickett ................ G06F 9/30185 |
| | | | 712/E9.035 |
| 6,088,789 A | * | 7/2000 | Witt ...................... G06F 9/3885 |
| | | | 711/119 |
| 6,202,130 B1 | | 3/2001 | Scales, III et al. |
| 6,321,326 B1 | * | 11/2001 | Witt ................... G06F 12/0848 |
| | | | 711/119 |
| 2004/0158681 A1 | | 8/2004 | Hooker |
| 2019/0079858 A1 | | 3/2019 | Gschwind et al. |
| 2020/0285470 A1 | * | 9/2020 | Zbiciak ............... G06F 12/0862 |

OTHER PUBLICATIONS

Extended European Search Report and search Opinion for Application No. 22185074.6, Dec. 23, 2022, 09 pages.
Office Action, EP App. No. 22185074.6, May 16, 2025, 08 pages.

* cited by examiner

*Primary Examiner* — Corey S Faherty
(74) *Attorney, Agent, or Firm* — Nicholson De Vos Webster & Elliott LLP

(57)          ABSTRACT

Techniques for shared data prefetch are described. An exemplary instruction for shared data prefetch includes at least one field for an opcode, at least one field for a source operand to provide a memory address at least a byte of data, wherein the opcode is to indicate that circuitry is to fetch of a line of data from memory at the provided address that contains the byte specified with the source operand and store that byte in at least a cache local to a requester, wherein the byte of data is to be stored in a shared state.

17 Claims, 22 Drawing Sheets

FIG. 1

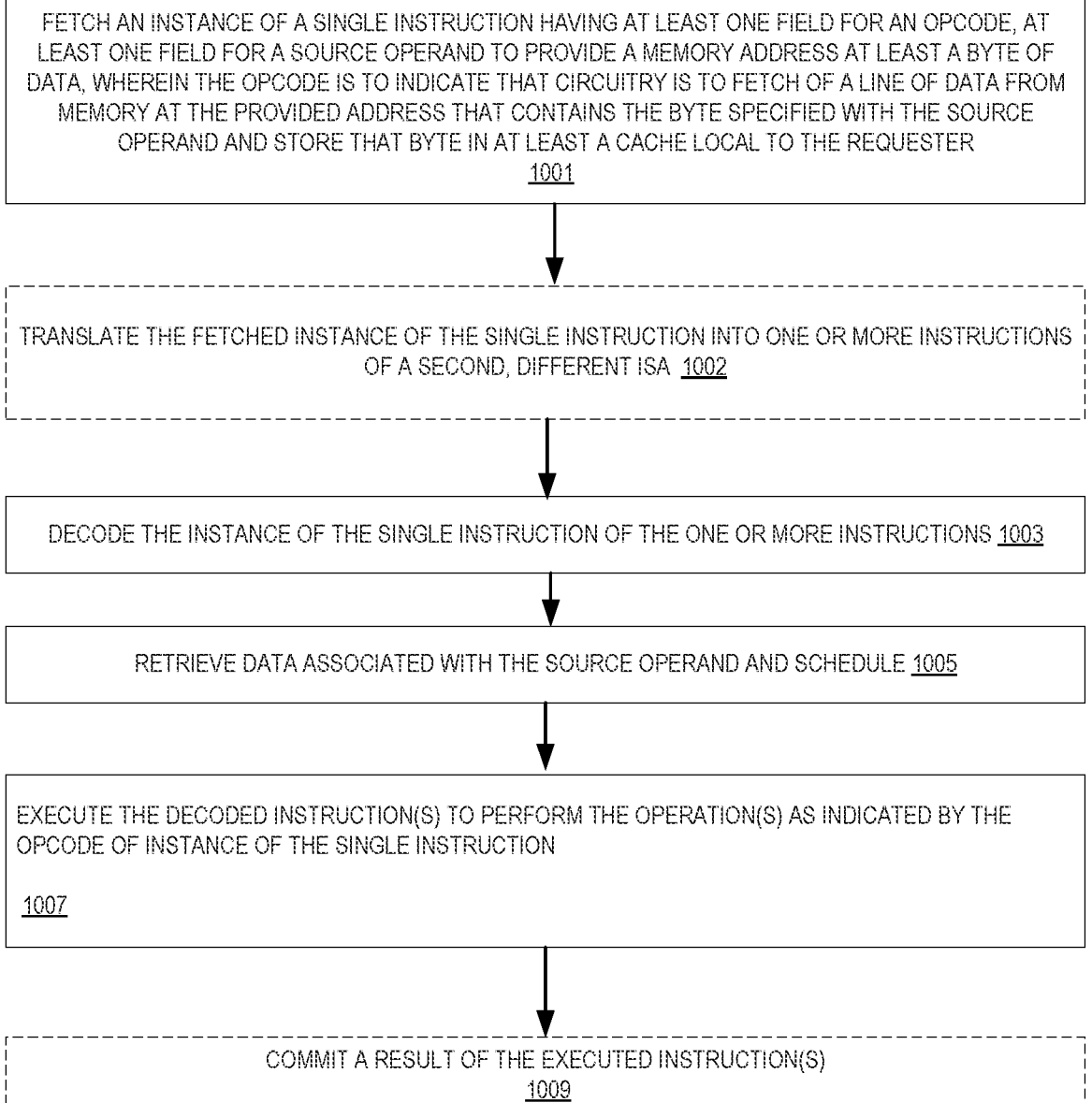

FETCH AN INSTANCE OF A SINGLE INSTRUCTION HAVING AT LEAST ONE FIELD FOR AN OPCODE, AT LEAST ONE FIELD FOR A SOURCE OPERAND TO PROVIDE A MEMORY ADDRESS AT LEAST A BYTE OF DATA, WHEREIN THE OPCODE IS TO INDICATE THAT CIRCUITRY IS TO FETCH OF A LINE OF DATA FROM MEMORY AT THE PROVIDED ADDRESS THAT CONTAINS THE BYTE SPECIFIED WITH THE SOURCE OPERAND AND STORE THAT BYTE IN AT LEAST A CACHE LOCAL TO THE REQUESTER
1001

TRANSLATE THE FETCHED INSTANCE OF THE SINGLE INSTRUCTION INTO ONE OR MORE INSTRUCTIONS OF A SECOND, DIFFERENT ISA 1002

DECODE THE INSTANCE OF THE SINGLE INSTRUCTION OF THE ONE OR MORE INSTRUCTIONS 1003

RETRIEVE DATA ASSOCIATED WITH THE SOURCE OPERAND AND SCHEDULE 1005

EXECUTE THE DECODED INSTRUCTION(S) TO PERFORM THE OPERATION(S) AS INDICATED BY THE OPCODE OF INSTANCE OF THE SINGLE INSTRUCTION

1007

COMMIT A RESULT OF THE EXECUTED INSTRUCTION(S)
1009

FIG. 10

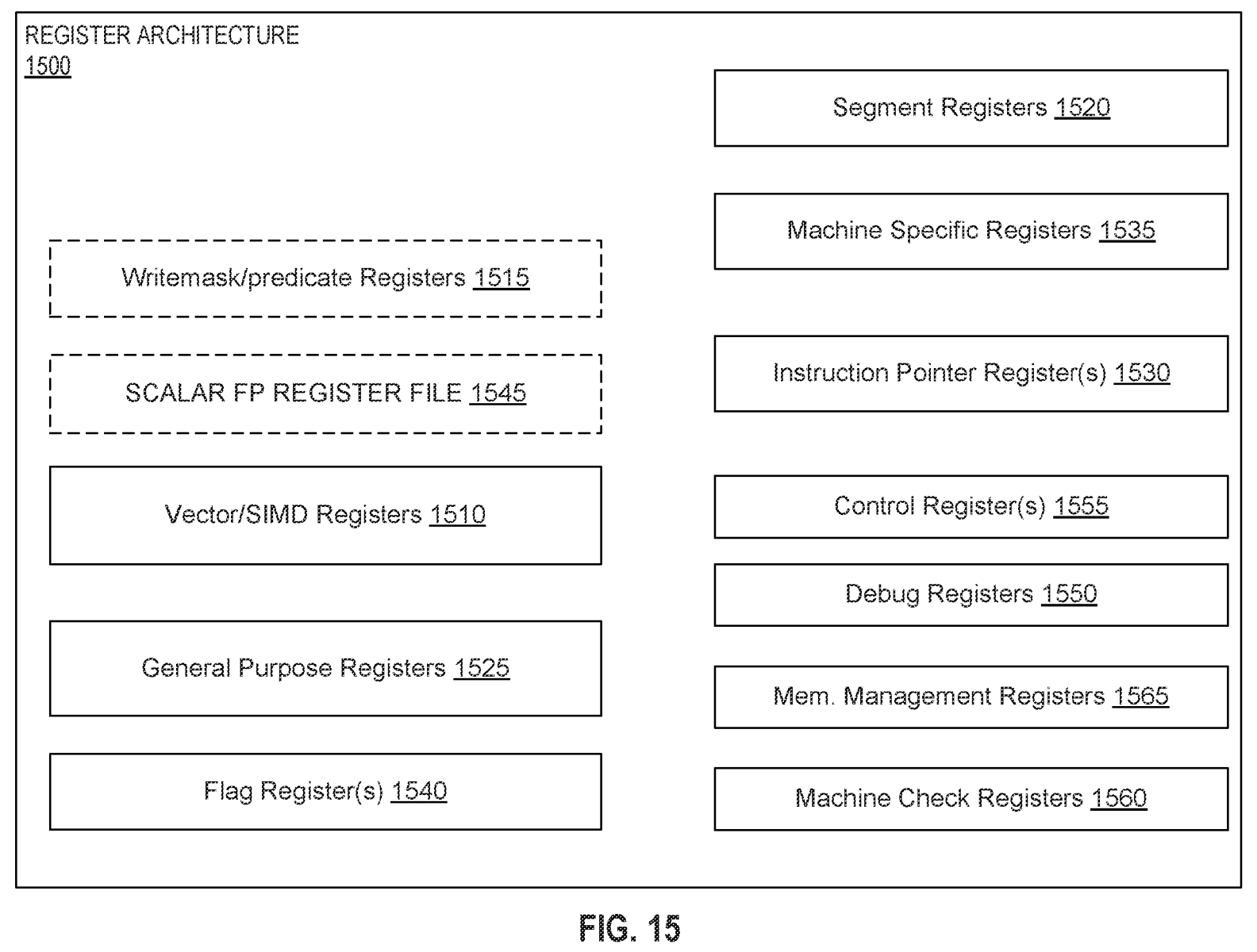

REGISTER ARCHITECTURE 1500

Segment Registers 1520

Machine Specific Registers 1535

Instruction Pointer Register(s) 1530

Control Register(s) 1555

Debug Registers 1550

Mem. Management Registers 1565

Machine Check Registers 1560

Writemask/predicate Registers 1515

SCALAR FP REGISTER FILE 1545

Vector/SIMD Registers 1510

General Purpose Registers 1525

Flag Register(s) 1540

FIG. 15

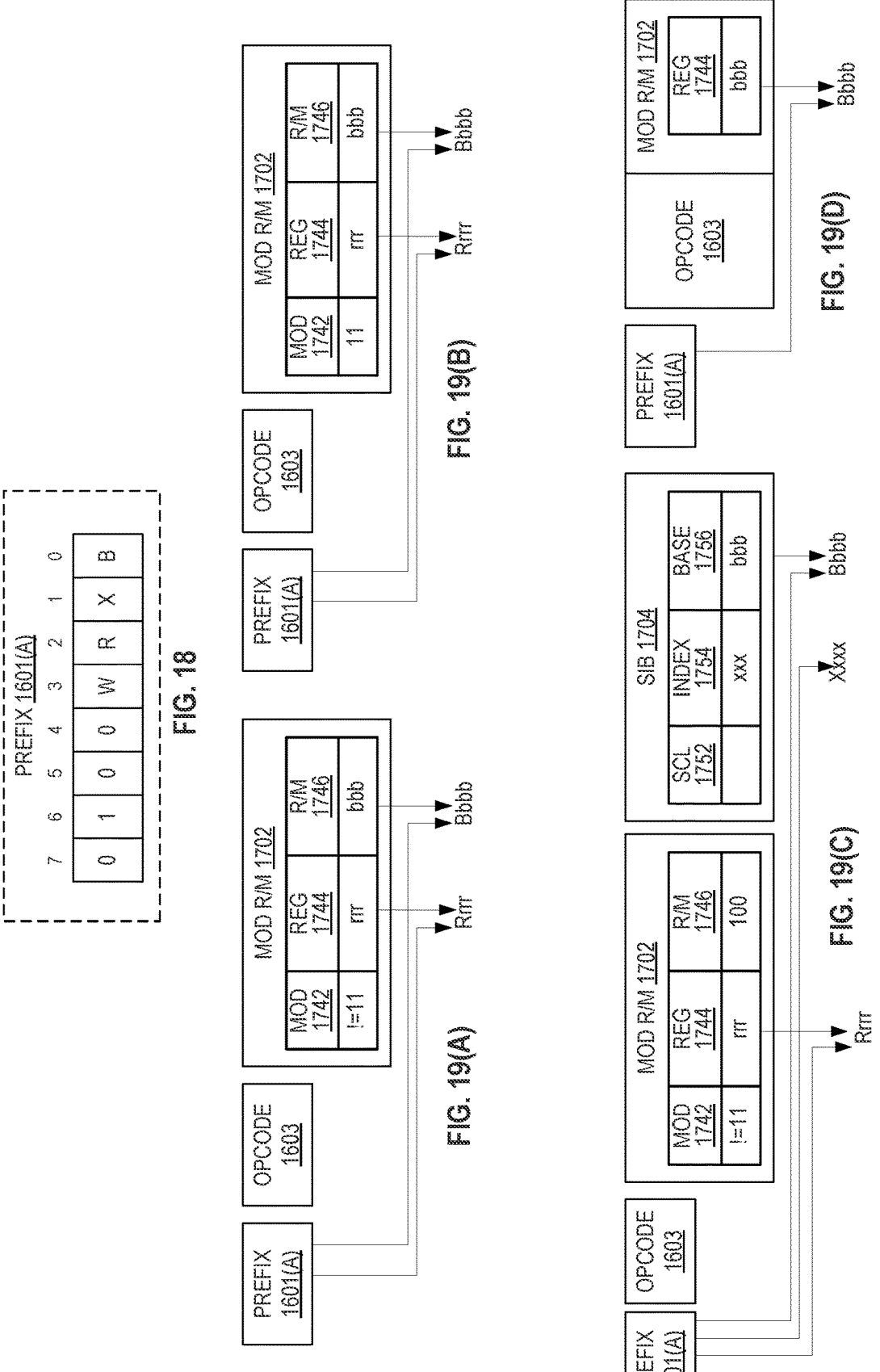

SHARED PREFETCH INSTRUCTION AND SUPPORT

BACKGROUND

Many processors today are optimized for running single-threaded applications. This includes policies and design decisions made in the cache hierarchy. When a thread executes loads or stores, hardware often assumes that the data being touched will be private to that thread. In some server processors, for example, on a load that misses in all caches, data is installed into the requesting core's L2 cache, in an exclusive state, and not installed into a shared LLC cache.

BRIEF DESCRIPTION OF DRAWINGS

Various examples in accordance with the present disclosure will be described with reference to the drawings, in which:

FIG. 1 is a block diagram of an illustrative central processing unit (CPU) complex that may be included in a processor according to examples.

FIG. 10 illustrates some examples of method performed to process a shared prefetch instruction.

FIG. 15 is a block diagram of a register architecture according to some examples.

FIG. 18 illustrates examples of a first prefix.

FIGS. 19(A)-(D) illustrate examples of how the R, X, and B fields of the first prefix 1601(A) are used.

DETAILED DESCRIPTION

Figure 2:
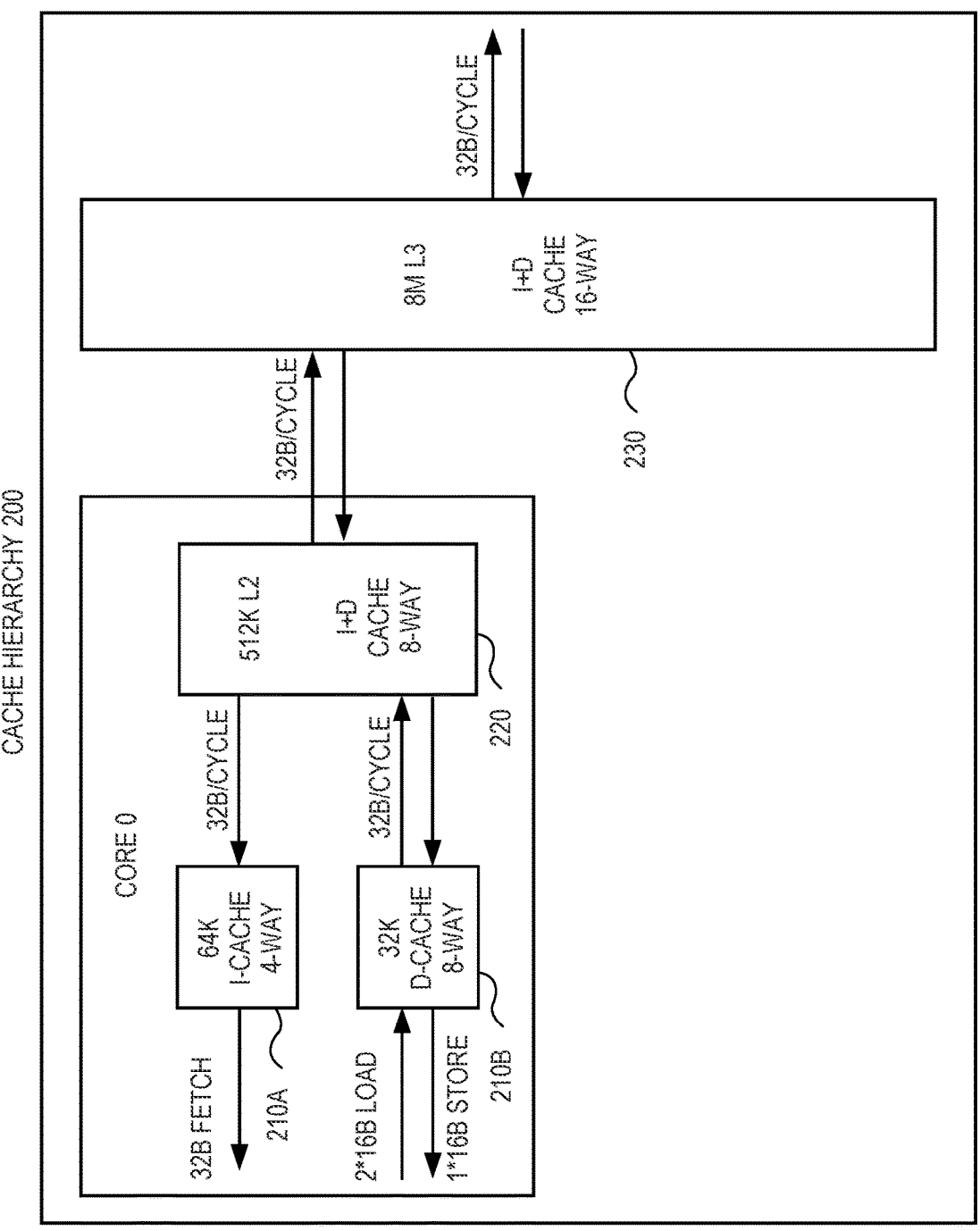
FIG. 2 is a block diagram of an illustrative cache hierarchy that may be included in a processor according to examples

The present disclosure relates to methods, apparatus, systems, and non-transitory computer-readable storage media for an instruction for the prefetch of shared data.

A downside to the caching policy of the background is that when running multi-threaded applications, hardware may treat the data in a suboptimal fashion. Detailed herein is a focus on handling read-shared data as that is a common/critical case. For read-shared data, there may be a benefit to install it into shared caches as quickly as possible so that later readers will hit in the shared cache; the alternative is to require a snoop or a redundant access to the next level of the memory hierarchy.

In some examples, a server CPU and/or chipset employs snoops when data is in one core's private cache and another core requests the data. For clean data, once snooped, the data is installed into the shared cache. If read-shared data is shared by a very large number of cores, these snoops are then a small fraction of accesses and are not critical. However, for data shared by a modest number of cores (say, 2, 4, or 8), the cost of these snoops can be quite large. This cost comes in the form of higher latency, higher mesh traffic, and increased pressure on the caching agent (sometimes called a caching and home agent (CHA)).

Note that some systems include a cacheline demote (CLDEMOTE) instruction that can be used by a thread to push data to a shared cache. Some instruction set architectures (ISAs) allow memory operations to specify (or hint) at the level of cache that data should belong in. This includes the hints such as prefetch data into all levels of a cache hierarchy (e.g., T0), prefetch data into level 2 cache and higher (e.g., T1), prefetch data into level 3 cache and higher, or an implementation-specific choice (e.g., T2), and/or prefetch data into non-temporal cache structure and into a location close to the processor, minimizing cache pollution (e.g., NTA).

Knowing that a piece of data is shared allows the hardware to place it in different caches than it otherwise might and/or put data into a different coherence state than it otherwise might. This decreases the amount of coherence traffic for shared data, and increases cache hit rates. This improves performance (through reduced latency and reduced pressure on the on-die mesh and various caches) and power efficiency.

In architectures with shared address spaces and hardware cache coherence, hardware typically cannot easily differentiate between when a thread is trying to load/store "private" data, i.e., data touched only by that thread, or "shared" data, i.e., data touched by multiple threads. Depending on the memory/cache hierarchy, there may be an advantage to treating private and shared data differently. In such systems, software may know that it is going to touch shared data, and can convey that information to hardware, allowing for more efficient handling of the data.

Detailed herein are examples of an instruction, and its support, that performs a prefetch with a hint that the data to be prefetched will be shared by other threads. The most critical case is for data that will be read-shared by other threads. In some examples, a bit in a model specific register (MSR), when set, alters the behavior at least some software prefetch instructions to behave as if they were touching shared data.

In particular, in some examples a "shared prefetch" instruction PREFETCHS m8 is described. The execution of this instruction causes a prefetch of line of data from memory that contains a byte specified by M8 with a hint to hardware that the data will be shared by multiple threads.

Figure 1:
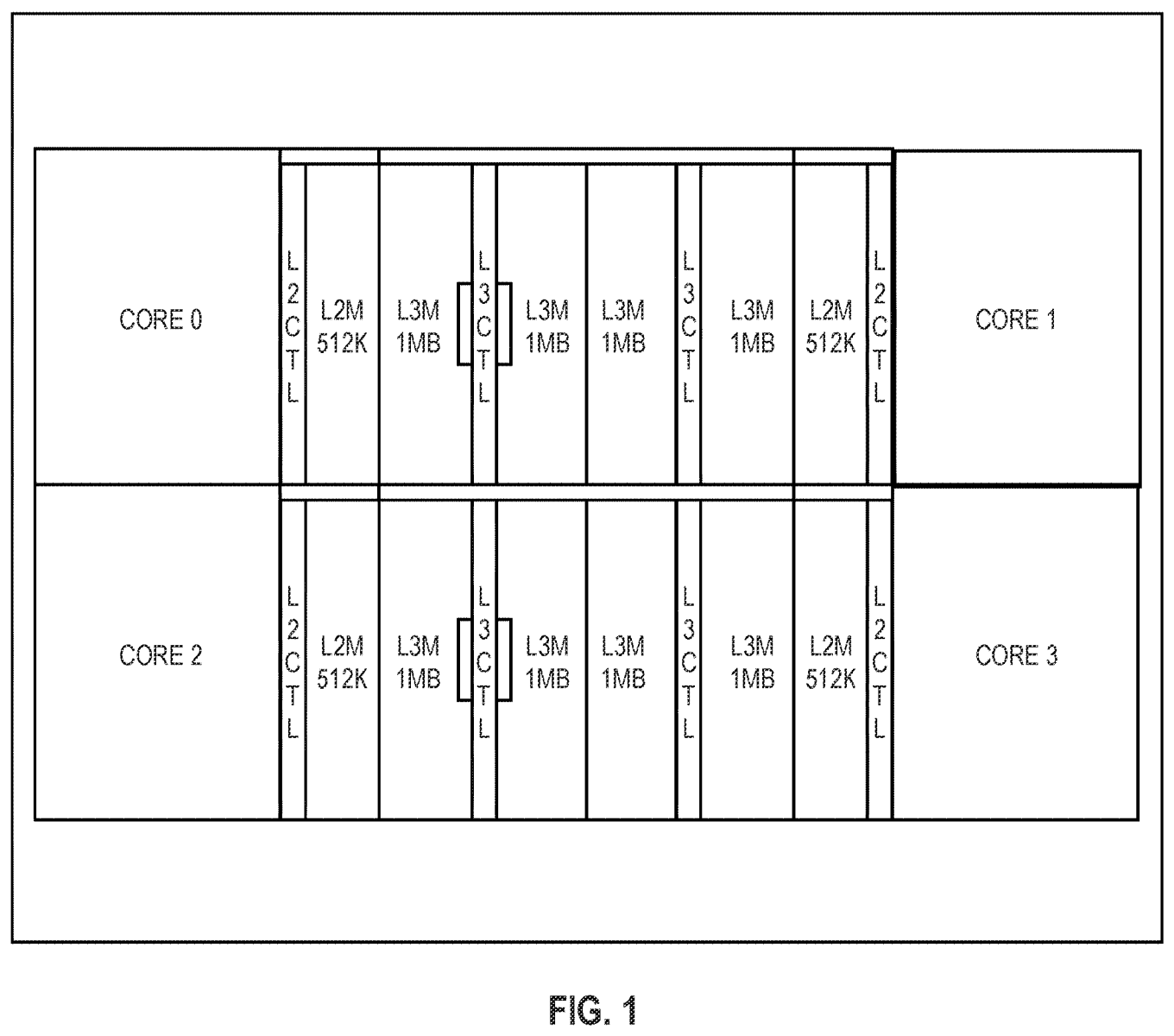

FIG. 1 is a block diagram of an illustrative central processing unit (CPU) complex that may be included in a processor according to examples. In some examples, the L3 cache is an 8 MB 16-way cache split over a four-core module (referred to as a CPU complex or CCX), affording a 2 MB "slice" of L3 cache per core. However, the L3 cache slices in a CCX are implemented such that the L3 cache is a shared cache. Multiple CCXs may be included in a single processor (e.g., two CCXs form a 16 MB L3 cache). The 8 MB caches on each CCX are separate, so they act as a last level cache per four-core module with the appropriate hooks into the other L3 cache to determine if data is needed (the protocols involved in the L3 cache design allow each core to access the L3 cache of each other core). Thus, these L1, L2, and L3 caches are coherent caches, with the L3 cache slices within a CCX and between CCXs being connected by a cache coherent interconnect (also referred to as a cache coherent fabric).

FIG. 2 is a block diagram of an illustrative cache hierarchy that may be included in a processor according to examples. In FIG. 2, cache hierarchy 200 includes L1 i-cache 210A and L1 d-cache 210B (collectively, L1 cache 210), L2 instruction and date cache 220, and level 3 (L3) instruction and data cache 230. In some examples, both L1 cache 210 and L2 cache 220 are private/local writeback caches, while L3 cache 230 is a victim cache. In some examples, L1 i-cache 210A is a 64 KB 4-way cache, L1 d-cache 210B is a 32 KB 8-way cache, L2 cache 220 is a 512 KB 8-way cache, and level 3 (L3) cache 230 is an 8 MB 16-way cache.

Memory Organization Features

Processor cores, processors, and systems according to examples may include various features related to the organization and use of memory. A number of such features are described separately using non-limiting examples below, but examples may include any combination of such features.

Exemplary Memory Hierarchies

Figure 3:
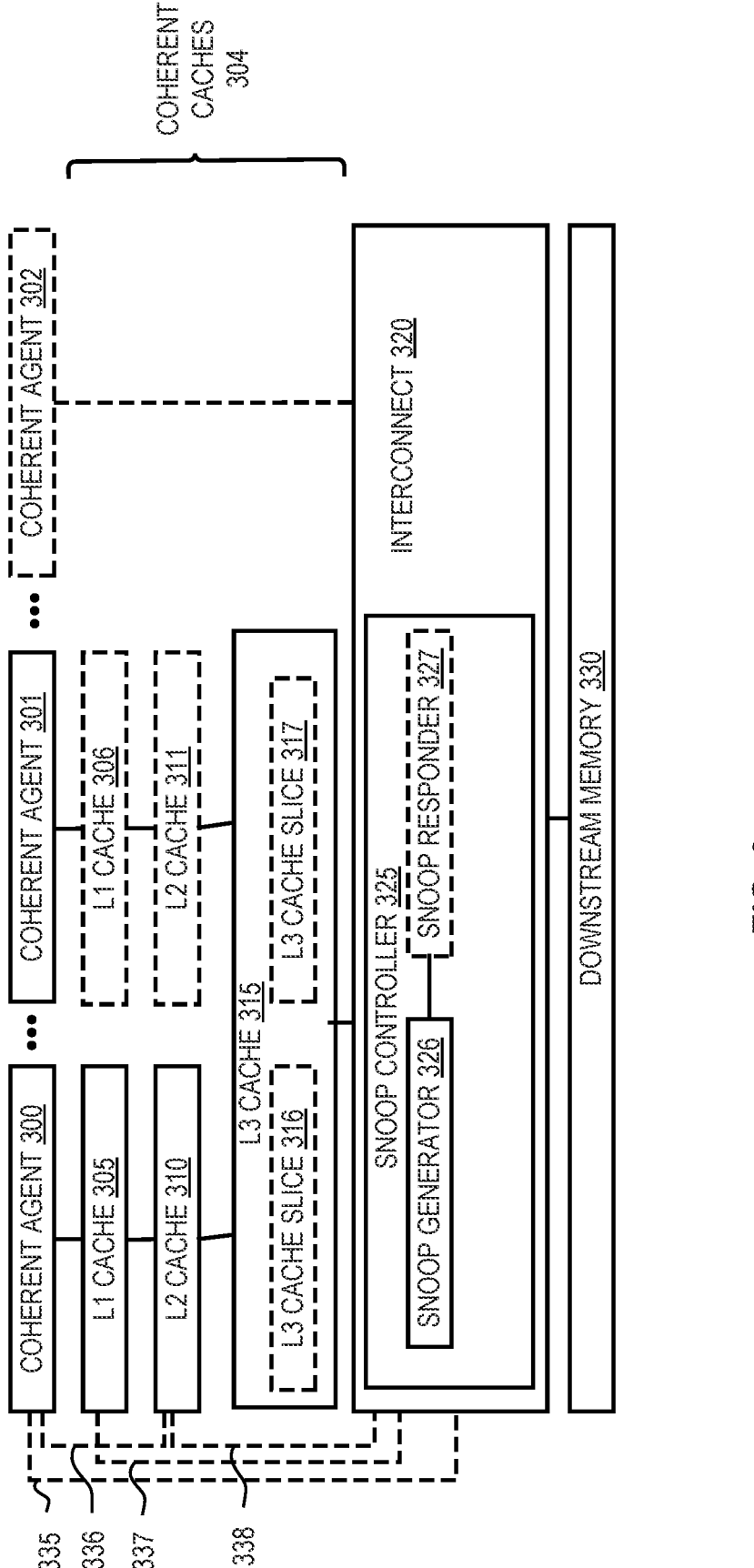
FIG. 3 illustrates examples using coherent agents.

FIG. 3 is a block diagram illustrating a memory hierarchy according to examples. The illustrated memory hierarchy can be implemented in conjunction with various processor cores, core clusters, CCXs, processors, computer architectures, etc. FIG. 3 illustrates a coherent agent 300 and a coherent agent 301, as well as the possibility of other coherent agents as represented by " . . . " and coherent agent 302 using a dashed box. The memory hierarchy in FIG. 3 includes coherent caches 304A, an interconnect 320, and downstream memory 330. Different examples may implement different numbers of caches and cache levels as part of coherent caches 304A. The coherent agents and the coherent caches are part of a cache coherence domain within which cache coherency is maintained using a cache coherency protocol (e.g., the MESI protocol which uses the cache coherency protocol states of "modified," "exclusive," "shared," and "invalid"; the MESIF protocol which adds the cache coherency protocol state of "forward"; the MOESI protocol which instead adds the cache coherency protocol state of "Owned"; and other such cache coherency protocols).

The coherent agent 300 is coupled to the interconnect 320 through one or more caches at successively lower levels of a cache hierarchy. A cache hierarchy includes a cache that is at the highest level of the cache hierarchy and that is coupled to the coherent agent 300, a cache (e.g., an L3 cache 315) that is at a lowest level of the cache hierarchy and that is coupled to the interconnect 320 (and thus, this cache is referred to as the lowest level cache or last level cache (LLC)), and zero or more caches (e.g., an L2 cache 310) that are at mid-level(s) of the cache hierarchy coupled to one of the caches at a higher level and one of the caches at a lower level (e.g., FIG. 3 illustrates the coherent agent 300 coupled to L1 cache 305, which is coupled to L2 cache 310, which is coupled to L3 cache 315, which is coupled to the interconnect 320).

The coherent agent 301 is also coupled to the interconnect through one or more levels of caches. FIG. 3 illustrates the coherent agent 301 coupled to an optional L1 cache 306, which is coupled to an optional L2 cache 311, which is coupled to the L3 cache 315. In addition, FIG. 3 also illustrates that optional coherent agent 302 may be coupled directly to the interconnect 320 (i.e., no have any coherent caches).

In addition to or in lieu of the connectivity including the coherent agents being coupled to the interconnect 320 through successive levels of caches, certain examples implement other connectivity to allow for direct or more direct communication (e.g., couple the coherent agent 300 directly to the interconnect 320, couple the coherent agent 300 directly to the L2 cache 310, couple the L1 cache 305 directly to the interconnect 320, and/or couple the L2 cache 310 directly to the interconnect 320 as respectively illustrated by dashed lines 335, 336, 337, and 338).

The interconnect 320 is coupled to the downstream memory 330 (e.g., through a set of one or more memory controllers (not shown)). The downstream memory 330 is at a lower level of the memory hierarchy than the coherent caches 304, and may include one or more types of memory and/or a hierarchy of memories (e.g., volatile memory and/or non-volatile memory, main memory, memory mapped input/output (MMIO), memory-side cache(s), two level memory (2LM), DRAM, flash, phase change memory, 3D Xpoint™).

The interconnect 320 (also referred to as a cache coherent interconnect, a fabric, an interconnect, part of an uncore, interconnect network, interconnect unit(s)) includes a snoop controller 325 to issue snoops to the coherent caches 304 and receive any responses therefrom. The snoop controller 325 includes a snoop generator 326 to issue snoops, and, in some examples, a snoop responder 327 to receive any responses. In addition, while in some examples the interconnect 320 is illustrated as being between the L3 cache 315 and the downstream memory 330, alternative examples may implement the interconnect 320 at another location (e.g., between the L2 caches and the L3 cache, with either a set or one or more memory controllers to the downstream memory 330 off the interconnect 320 (e.g., as a home agent) or a set or one or more memory controllers between the L3 cache 315 and the downstream memory 330). The interconnect 320 (e.g., as part of the snoop controller 325) may include other items, such as a snoop filter (not shown).

Different examples may be implemented with different numbers of the coherent agents as general-purpose cores (also known as central processing units (CPUs)). For example, in some examples, the coherent agent 300 is a core, the coherent agent 31 is a core, there are zero or more additional coherent agents that are cores, and there are zero or more additional coherent agents that are other types of agents (e.g., general-purpose processors, server processors or processing elements for use in a server-environment, coprocessors (e.g., security coprocessors) high-throughput MIC processors, GPGPU's, accelerators (such as, e.g., graphics accelerators or digital signal processing (DSP) units, cryptographic accelerators, fixed function accelerators, machine learning accelerators, networking accelerators, or computer vision accelerators), field programmable gate arrays, or any other processor or processing device, to name just a few examples).

In some examples, the coherent agents and the coherent caches 304 are implemented as in FIGS. 37 and 38. For example, in a CCX, there are 4 coherent agents that are cores, a private/local L1 cache per core, a private/local L2 cache per core, and a shared L3 cache; and there can be multiple CCXs coupled together in a single processor. The L1 and L2 caches are write back caches, the L2 caches are inclusive caches, and the L3 cache is a victim cache. In addition, the L3 cache 315 is split into slices between multiple coherent agents (e.g., 2 MB per core over 4 cores, totaling 8 MB) within a module (a CCX), and optionally between one or more such modules (e.g., two CCXs, each with 8 MB, to form a 16 MB L3 cache). FIG. 3 illustrates this with L3 cache slice 316 of coherent agent 300 and L3 cache slice 317 of coherent agent 301. The interconnect 320 may, for example, represent: 1) just an interconnect within a CCX; 2) an interconnect within and between CCXs; 3) separate interconnects within different CCXs, as well as an interconnect(s) between CCXs. Different examples may implement the interconnect 320 differently, including one or more of a ring, multiple rings, point to point links, shared buss(es), etc. In examples that implement a home agent and caching agents, the interconnect 320 is considered to include the caching agents.

One or more, or all, of the coherent agents in FIG. 3 may be implemented to execute a shared prefetch instruction. The coherent agent that is currently executing a shared prefetch instruction is the "issuing agent," "issuing coherent agent," or "first agent", and its caches are referred to as the Lx cache of the issuing agent (where x may be a 1, 2, or 3; and where the L3 cache is implemented with slices, it is the L3 cache slice of the issuing agent). In the discussion below, this will be coherent agent 300. A coherent agent that is not currently executing a shared prefetch instruction is referred to as the "coherent but no issuing agent," "non-issuing agent," "non-issuing coherent agent," or "second agent" (as discussed above, there may be multiple second agents, but one will be discussed below for simplicity), and its caches are referred to as the Lx cache of the second agent (where x may be a 1, 2, or 3; and where the L3 cache is implemented with slices, it is the L3 cache slice of the second agent).

Exemplary Cache Architecture

Figure 4:
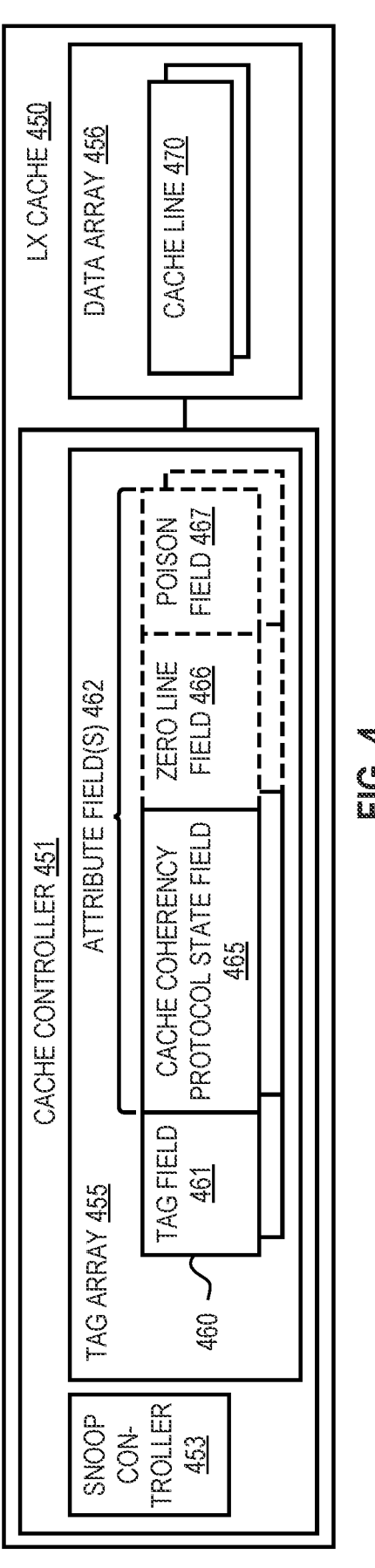
FIG. 4 is a block diagram illustrating a cache in a processor that at least partially implements a shared prefetch instruction according to examples.

FIG. 4 is a block diagram illustrating a cache in a processor that at least partially implements a shared prefetch instruction according to examples. FIG. 4 includes a Lx cache 450, where x indicates the level in the cache hierarchy (e.g., 1, 2, 3). Lx cache 450 includes a cache controller 451 to control the operation of the cache, including detecting hits/misses, causing writes/reads to cache lines, receiving snoops (and thus, in some examples the cache controller 451 includes a snoop interface, and in some examples, a snoop controller 443), etc. The cache controller includes a tag array 455 with entries 460 (which includes what is sometimes referred to as the "tag state"), and the Lx cache 450 includes a data array 456 with corresponding cache lines 470. Each of the entries 460 includes a tag field 461 to store a tag used to determine whether a given address hits or misses the data in the corresponding one of the cache lines 470. In addition, each of the entries 460 includes a set of one or more attribute field(s) 462 (sometimes referred to as "tag state") to store attributes of the data stored in the corresponding one of the cache lines 470. The attribute field(s) 462 include a cache coherency protocol state field 465 to store a value indicating a current cache coherency protocol state of the data stored in the corresponding one of the cache lines 470. The attribute field(s) 462 may optionally include other fields, such as a zero-line field 466, a poison field 467, an error correction code field (not shown). While FIG. 4 illustrates the attribute field(s) 462 being in the tag array, alternative examples may implement these field(s) in a separate state array (not shown). In some examples, a given cache line may have multiple poison indications (e.g., one for the two 32-byte chunks of a 64-byte cache line) in the poison field 467. While FIG. 4 illustrates a separate poison field 467, alternative examples may encode the poison indications into another field (e.g., the error correction code (ECC) field or cache coherency protocol state field).

Responsive to a hit in the cache (e.g., based on a tag in the tag field 461), the cache controller 451 includes circuitry (e.g., cache coherency protocol state circuitry or other circuitry) to respond to the cache coherency protocol state in the cache coherency protocol state field 456 for the hit (e.g., the cache coherency protocol state field 456 corresponding to the tag field 461 whose tag matched); which response differs between examples and based on various factors (e.g., whether the cache lookup was initiated responsive to a write command, a read command, a snoop (and possibly the type of snoop)). For example, in some examples, the response is to determine whether the cache coherency protocol state is one that grants the cache authority to modify the cache line (e.g., a "modified" or "exclusive" state) responsive to a write command and/or certain types of snoops as discussed in more detail below. In some examples, the cache controller 451 includes: 1) hit-miss circuity (not shown) to determine whether there is a hit or miss in the cache responsive to a command (e.g., a write command, a read command, a snoop command); 2) the snoop controller 443 coupled to a snoop interface (not shown) to receive snoops and to transmit response messages to the snoops; and 3) cache line read circuitry (not shown) and cache line write circuitry (not shown).

To demonstrate the conceptual benefits of such an instruction, the following figures show behavior external to a core (also called an uncore) with and without the instruction for two cases: data that starts in main memory and data that starts dirty in one core's private cache.

Figure 5:
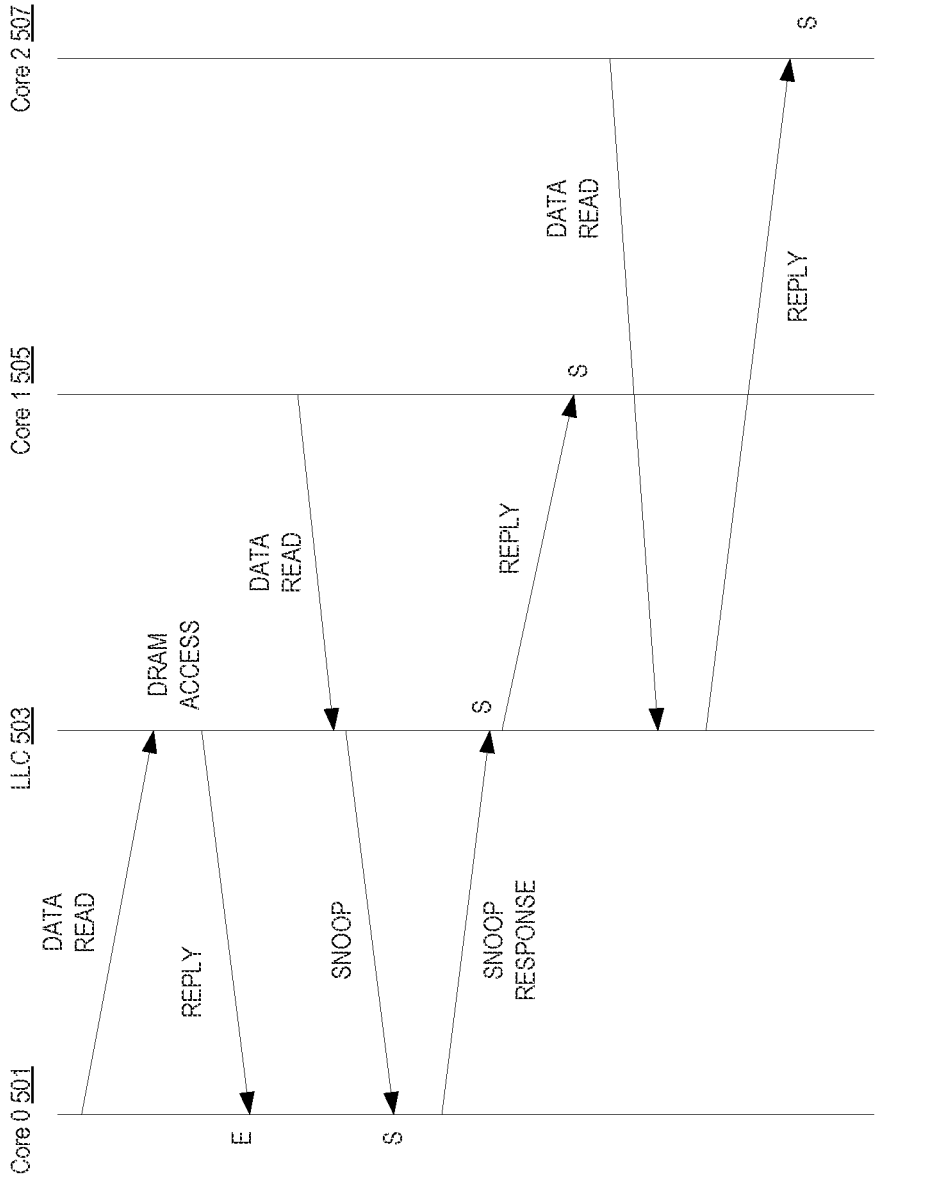
FIG. 5 illustrates examples of handling data that starts in main memory without a shared prefetch instruction

FIG. 5 illustrates examples of handling data that starts in main memory without a shared prefetch instruction. Here, the first reader, Core 0 501, misses in the LLC 503, fetches the data from DRAM, and places the data in its private cache in exclusive state (E). This works well if the line is private and Core 0 501 was to eventually write the line. However, it is not optimal for a read sharing case. Here, the second reader, Core 1 505, misses in LLC 503, and snoops a copy of the data from Core 0 501 (which causes a state change to shared state (S); this also triggers the placement of a copy of the line into the LLC 503 and Core 1 503 in a shared state. Finally, the third reader, Core 2 507, hits in LLC 503.

Figure 6:
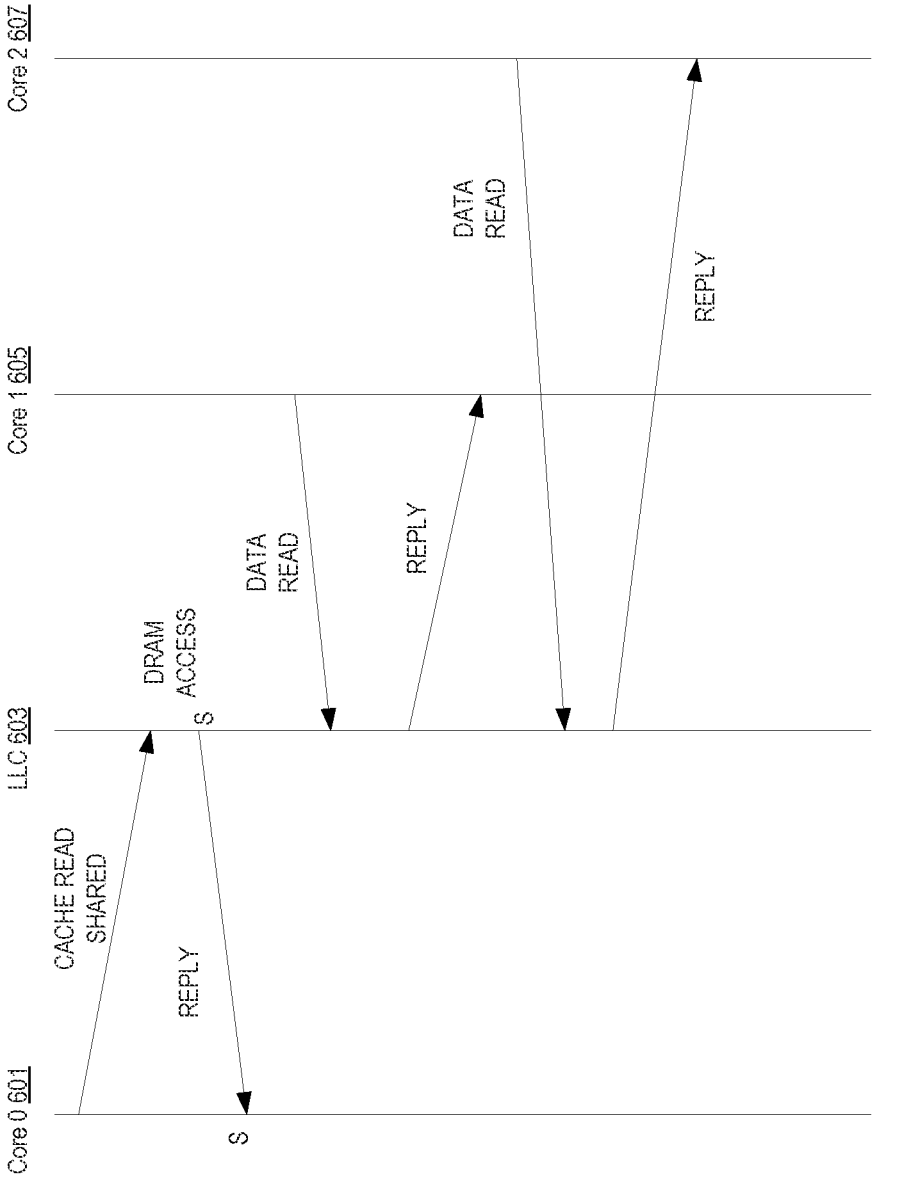
FIG. 6 illustrates examples of handling data that starts in main memory with a shared prefetch instruction.

FIG. 6 illustrates examples of handling data that starts in main memory with a shared prefetch instruction. For software using the shared prefetch instruction, the first reader (core 0 601) will use a shared prefetch instruction to touch the data. This will trigger a different kind of request to the uncore, which will tell the uncore that the data being touched should be treated as shared data. As shown, the shared prefetch from Core 0 601 triggers a code read shared. This instructs the caching agent/last level cache (LLC) to install the data into the LLC 603 in shared state (S) and return a copy to Core 0 601 to be stored in a shared state (S). Later readers, both Core 1 605 and Core 2 607, hit the shared data in LLC 603. The diagram shows Core 1 605 and Core 2 607 doing normal reads, but in practice, they are likely to also issue shared prefetches, since they will not know who will touch the line first.

Figure 7:
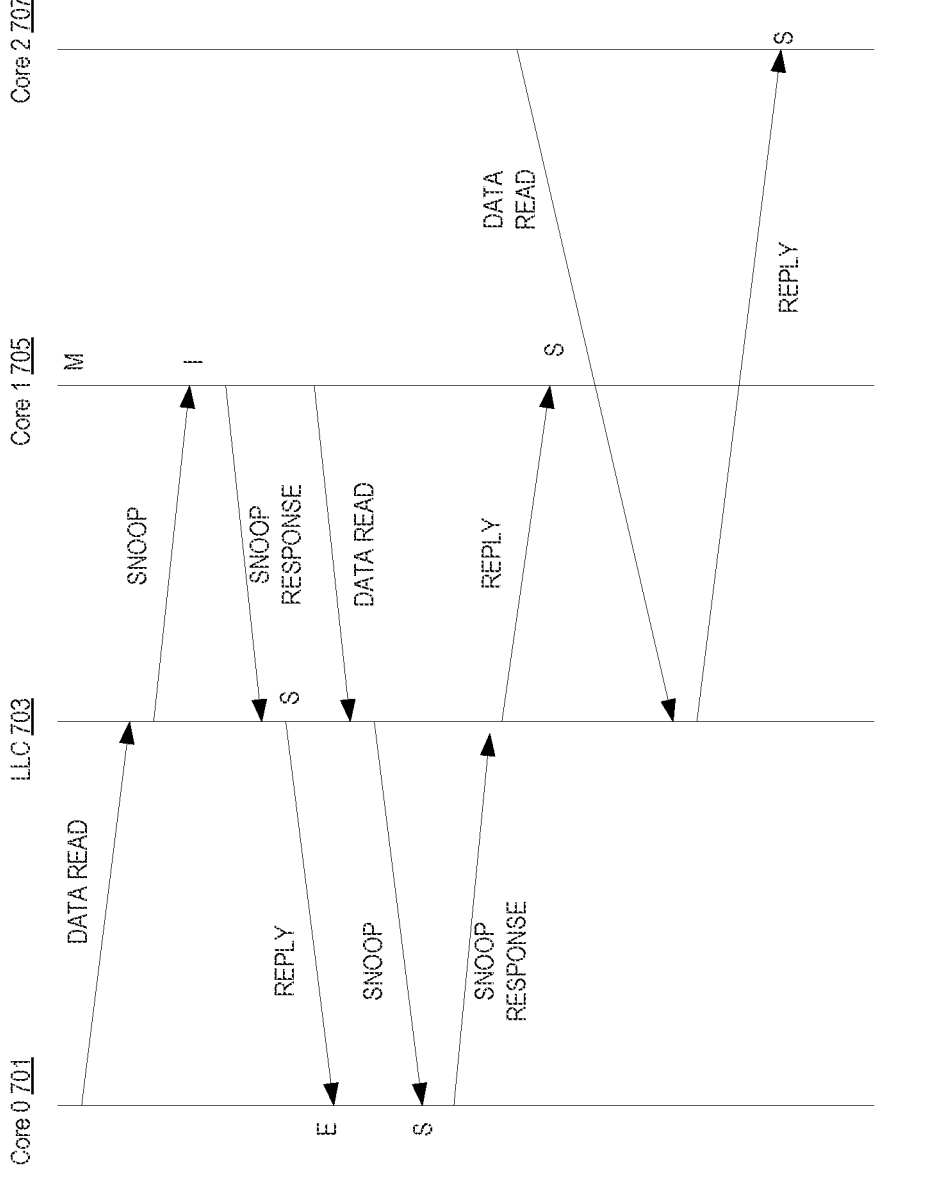
FIG. 7 illustrates examples of handling data that starts in a core's private cache in a modified state (M) without a shared prefetch instruction.

FIG. 7 illustrates examples of handling data that starts in a core's private cache in a modified state (M) without a shared prefetch instruction. Here, the first reader, Core 0 701, misses in the LLC 703, and snoops the data out of Core 1's 705 private cache. The coherence protocol uses an M2I (modified-to-invalid) flow, which migrates ownership of the line from Core 1 705 to Core 0 701. This works well when Core 0 701 would go on to write to the line, but is not optimal for a read sharing case. Here, Core 1 705 reads the data next, and it misses in its own private cache (even though it had a copy of the line earlier) and the LLC 703, and snoops the line back from Core 0 701; this triggers the placement of a copy of the line into the LLC 703. Finally, the third reader, Core 2 707, hits in LLC 703.

Figure 8:
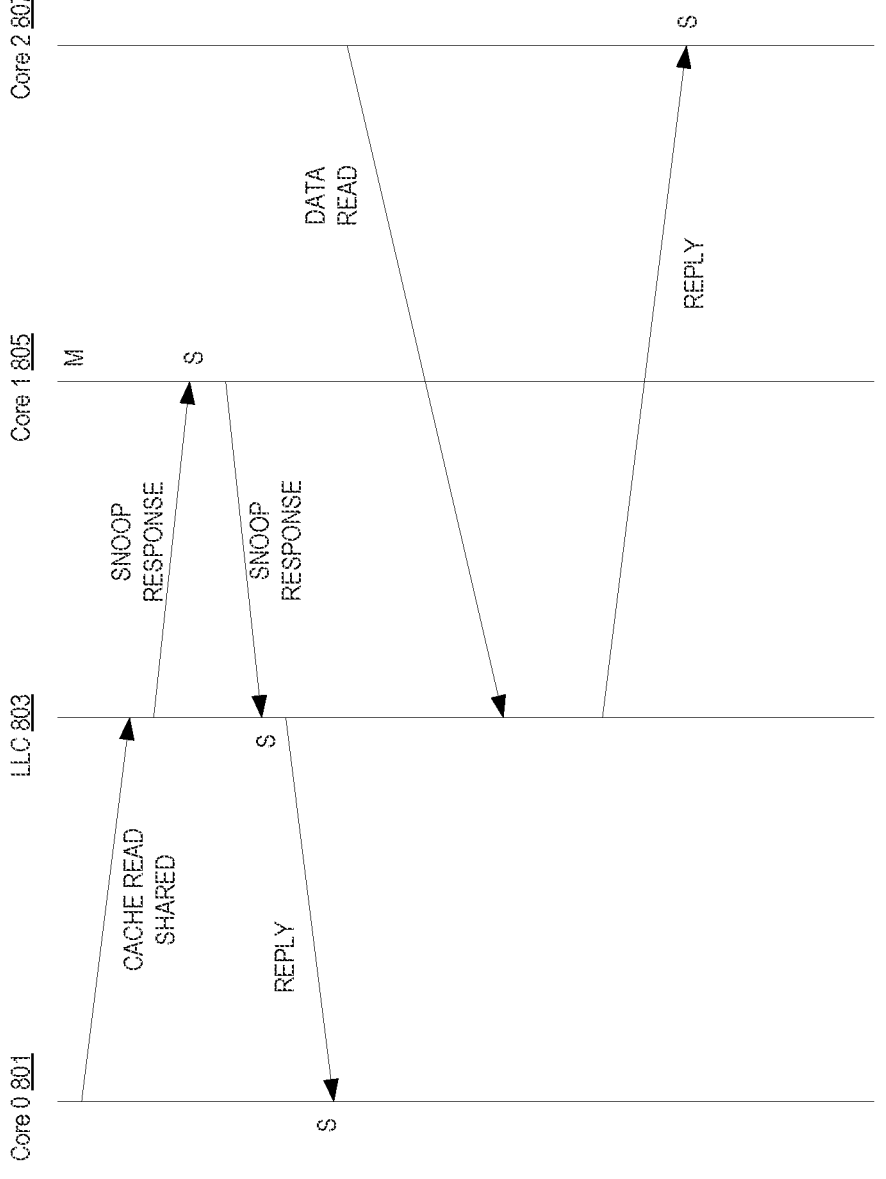
FIG. 8 illustrates examples of handling data that starts in a core's private cache in a modified state (M) with a shared prefetch instruction.

FIG. 8 illustrates examples of handling data that starts in a core's private cache in a modified state (M) with a shared prefetch instruction. The first reader (Core 0 801) will use a shared prefetch instruction to touch the data. As with the previous case (data in DRAM), the shared prefetch from Core 0 801 triggers a code read shared. This instructs the LLC 803 to install the data into the LLC 803 in a shared state and return a copy to Core 0 803. Since the data starts in Core 1's 805 cache in modified state, hardware snoops the data out of Core 1's 805 private cache using an M2S (modified-to-shared) flow, which leaves a copy of the line in Core 1's 805 private cache. When Core 1 805 reads the line later, it hits in its private cache (not shown in the diagram, since this results in no traffic). Finally, when Core 2 reads 807, it hits in LLC 803.

As can be seen from the illustrations above, for read-shared data, installing the line into the shared cache instead of trying to place it into a single private cache results in greatly reduced coherence transactions.

In some examples, a mechanism is used to override some or all existing prefetch instructions in an application and treat them as shared prefetches. The override would be done by software, and could be done via a configuration register, a machine-specific register, a range register, a new bit in a page table entry, or another mechanism for specifying a subset of prefetch instructions (specific opcodes and/or specific IPs) and/or a range/set of data or instruction addresses. Hardware in the core or uncore responsible for the override would detect that the prefetch instruction is a target for the override and would alter its behavior.

Figure 9:
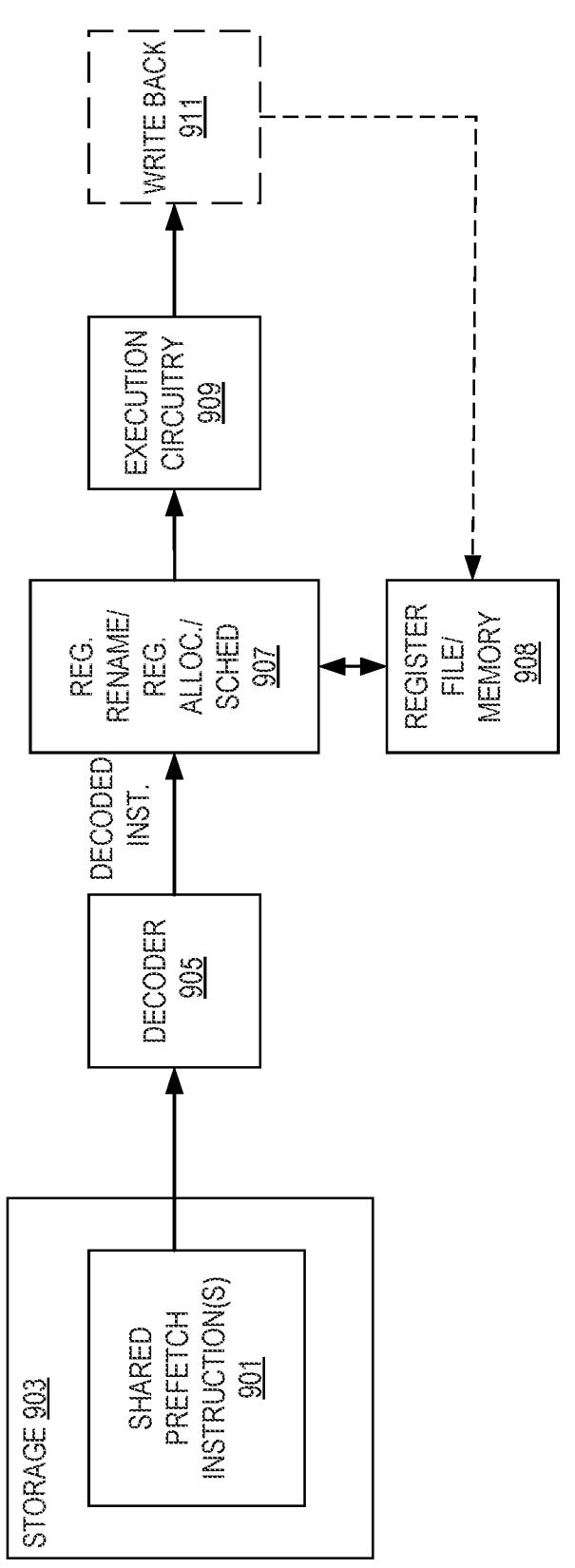
FIG. 9 illustrates examples of hardware to process an instruction such as a shared prefetch instruction.

FIG. 9 illustrates examples of hardware to process an instruction such as a shared prefetch instruction. As illustrated, storage 903 stores a shared prefetch instruction 901 to be executed.

The instruction 901 is received by decode circuitry 905. For example, the decode circuitry 905 receives this instruction from fetch logic/circuitry.

More detailed examples of at least one instruction format will be detailed later. The decode circuitry 905 decodes the instruction into one or more operations. In some examples, this decoding includes generating a plurality of micro-operations to be performed by execution circuitry (such as execution circuitry 909). The decode circuitry 905 also decodes instruction prefixes.

In some examples, register renaming, register allocation, and/or scheduling circuitry 907 provides functionality for one or more of: 1) renaming logical operand values to physical operand values (e.g., a register alias table in some examples), 2) allocating status bits and flags to the decoded instruction, and 3) scheduling the decoded instruction for execution on execution circuitry out of an instruction pool (e.g., using a reservation station in some examples).

Registers (register file) and/or memory 908 store data as operands of the instruction to be operated on by execution circuitry 909. Exemplary register types include packed data registers, general purpose registers, and floating-point registers.

Execution circuitry 909 at least partially executes the decoded instruction. Exemplary detailed execution circuitry is shown in FIGS. 1, 3, 13, etc. The execution of the decoded instruction causes the execution circuitry and cache coherency circuitry (e.g., snoop controller, coherent agents, cache controller, etc.) to fetch of a line of data from memory that contains the byte specified with the source operand and store that byte in at least a cache local to the requester. Note the requester is the core that had the shared prefetch instruction.

In some examples, retirement/write back circuitry 911 architecturally commits and retires the instruction.

Some examples of a format for a shared prefetch instruction is PREFETCHS M8. In some examples, PREFETCHS is the opcode mnemonic of the instruction. M8 is at least one field for a memory address where the data to be prefetched is. Note that the opcode indicates that a fetch of a line of data from memory that contains the byte specified with the source operand (M8) is to be stored in a local cache in a shared state in some examples. In some examples, the indication that the data to be prefetched is to be stored in a shared state is made in a different manner such as utilizing bits of a ModR/M byte 1744 such as the REG field 'BFG44, utilizing a bit in an MSR, etc. The source operand M8 is a byte memory location.

FIG. 10 illustrates some examples of method performed to process a shared prefetch instruction. For example, a processor core as shown in FIG. 13(B), a pipeline as detailed below, etc. performs this method.

At 1001, an instance of a single shared prefetch instruction is fetched. The single instruction having at least one field for an opcode, at least one field for a source operand to provide a memory address at least a byte of data, wherein the opcode is to indicate that circuitry is to fetch of a line of data from memory at the provided address that contains the byte specified with the source operand and store that byte in at least a cache local to the requester. Note the requester is the core that had the shared prefetch instruction. Depending upon the implementation, the opcode itself, or other indicator, dictates that the byte is to be stored in a shared state. Additionally, the byte is stored in an LLC in some examples.

In some examples, the fetched instance of the single instruction of a first instruction set is translated into one or more instructions of a second instruction set at 1002.

The instance of the single instruction, or the one or more translated instructions of the second instruction set, is/are decoded at 1003. In some examples, the translation and decoding are merged.

Data values associated with the source operand of the decoded instruction is retrieved at 1005.

At 1007, the decoded instruction(s) of the second instruction set is/are executed by execution circuitry (hardware)

such as that detailed herein. For the share prefetch instruc-
tion, the execution will cause circuitry to fetch of a line of
data from memory at the provided address that contains the
byte specified with the source operand and store that byte in
at least a cache local to the requester. Note the requester is
the core that had the shared prefetch instruction. Depending
upon the implementation, the opcode itself, or other indica-
tor, dictates that the byte is to be stored in a shared state.
Additionally, the byte is stored in an LLC in some examples.

In some examples, the instruction is committed or retired
at 1009.

Exemplary Computer Architectures

Detailed below are describes of exemplary computer
architectures. Other system designs and configurations
known in the arts for laptops, desktops, handheld PCs,
personal digital assistants, engineering workstations, serv-
ers, network devices, network hubs, switches, embedded
processors, digital signal processors (DSPs), graphics
devices, video game devices, set-top boxes, micro control-
lers, cell phones, portable media players, handheld devices,
and various other electronic devices, are also suitable. In
general, a huge variety of systems or electronic devices
capable of incorporating a processor and/or other execution
logic as disclosed herein are generally suitable.

Figure 11:
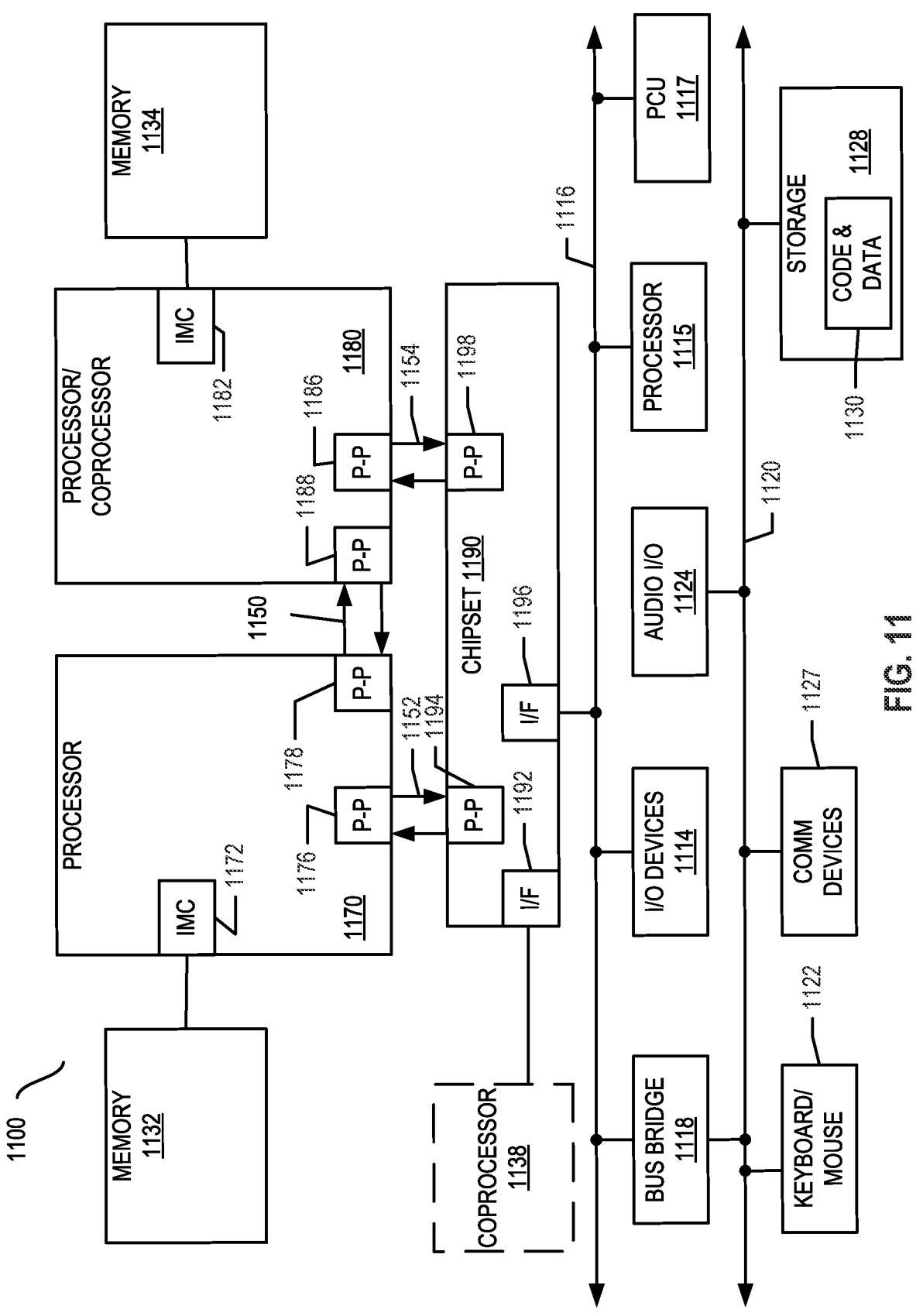
FIG. 11 illustrates examples of an exemplary system.

FIG. 11 illustrates examples of an exemplary system.
Multiprocessor system 1100 is a point-to-point interconnect
system and includes a plurality of processors including a
first processor 1170 and a second processor 1180 coupled via
a point-to-point interconnect 1150. In some examples, the
first processor 1170 and the second processor 1180 are
homogeneous. In some examples, first processor 1170 and
the second processor 1180 are heterogenous.

Processors 1170 and 1180 are shown including integrated
memory controller (IMC) units circuitry 1172 and 1182,
respectively. Processor 1170 also includes as part of its
interconnect controller units point-to-point (P-P) interfaces
1176 and 1178; similarly, second processor 1180 includes
P-P interfaces 1186 and 1188. Processors 1170, 1180 may
exchange information via the point-to-point (P-P) intercon-
nect 1150 using P-P interface circuits 1178, 1188. IMCs
1172 and 1182 couple the processors 1170, 1180 to respec-
tive memories, namely a memory 1132 and a memory 1134,
which may be portions of main memory locally attached to
the respective processors.

Processors 1170, 1180 may each exchange information
with a chipset 1190 via individual P-P interconnects 1152,
1154 using point to point interface circuits 1176, 1194, 1186,
1198. Chipset 1190 may optionally exchange information
with a coprocessor 1138 via a high-performance interface
1192. In some examples, the coprocessor 1138 is a special-
purpose processor, such as, for example, a high-throughput
MIC processor, a network or communication processor,
compression engine, graphics processor, GPGPU, embed-
ded processor, or the like.

A shared cache (not shown) may be included in either
processor 1170, 1180 or outside of both processors, yet
connected with the processors via P-P interconnect, such
that either or both processors' local cache information may
be stored in the shared cache if a processor is placed into a
low power mode.

Chipset 1190 may be coupled to a first interconnect 1116
via an interface 1196. In some examples, first interconnect
1116 may be a Peripheral Component Interconnect (PCI)
interconnect, or an interconnect such as a PCI Express
interconnect or another I/O interconnect. In some examples,
one of the interconnects couples to a power control unit
(PCU) 1117, which may include circuitry, software, and/or
firmware to perform power management operations with
regard to the processors 1170,1180 and/or co-processor
1138. PCU 1117 provides control information to a voltage
regulator to cause the voltage regulator to generate the
appropriate regulated voltage. PCU 1117 also provides con-
trol information to control the operating voltage generated.
In various examples, PCU 1117 may include a variety of
power management logic units (circuitry) to perform hard-
ware-based power management. Such power management
may be wholly processor controlled (e.g., by various pro-
cessor hardware, and which may be triggered by workload
and/or power, thermal or other processor constraints) and/or
the power management may be performed responsive to
external sources (such as a platform or power management
source or system software).

PCU 1117 is illustrated as being present as logic separate
from the processor 1170 and/or processor 1180. In other
cases, PCU 1117 may execute on a given one or more of
cores (not shown) of processor 1170 or 1180. In some cases,
PCU 1117 may be implemented as a microcontroller (dedi-
cated or general-purpose) or other control logic configured
to execute its own dedicated power management code,
sometimes referred to as P-code. In yet other examples,
power management operations to be performed by PCU
1117 may be implemented externally to a processor, such as
by way of a separate power management integrated circuit
(PMIC) or another component external to the processor. In
yet other examples, power management operations to be
performed by PCU 1117 may be implemented within BIOS
or other system software.

Various I/O devices 1114 may be coupled to first inter-
connect 1116, along with an interconnect (bus) bridge 1118
which couples first interconnect 1116 to a second intercon-
nect 1120. In some examples, one or more additional pro-
cessor(s) 1115, such as coprocessors, high-throughput MIC
processors, GPGPU's, accelerators (such as, e.g., graphics
accelerators or digital signal processing (DSP) units), field
programmable gate arrays (FPGAs), or any other processor,
are coupled to first interconnect 1116. In some examples,
second interconnect 1120 may be a low pin count (LPC)
interconnect. Various devices may be coupled to second
interconnect 1120 including, for example, a keyboard and/or
mouse 1122, communication devices 1127 and a storage unit
circuitry 1128. Storage unit circuitry 1128 may be a disk
drive or other mass storage device which may include
instructions/code and data 1130, in some examples. Further,
an audio I/O 1124 may be coupled to second interconnect
1120. Note that other architectures than the point-to-point
architecture described above are possible. For example,
instead of the point-to-point architecture, a system such as
multiprocessor system 1100 may implement a multi-drop
interconnect or other such architecture.

Exemplary Core Architectures, Processors, and Computer
Architectures

Processor cores may be implemented in different ways,
for different purposes, and in different processors. For
instance, implementations of such cores may include: 1) a
general purpose in-order core intended for general-purpose
computing; 2) a high performance general purpose out-of-
order core intended for general-purpose computing; 3) a
special purpose core intended primarily for graphics and/or
scientific (throughput) computing. Implementations of dif-
ferent processors may include: 1) a CPU including one or
more general purpose in-order cores intended for general-
purpose computing and/or one or more general purpose
out-of-order cores intended for general-purpose computing;
and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 12:
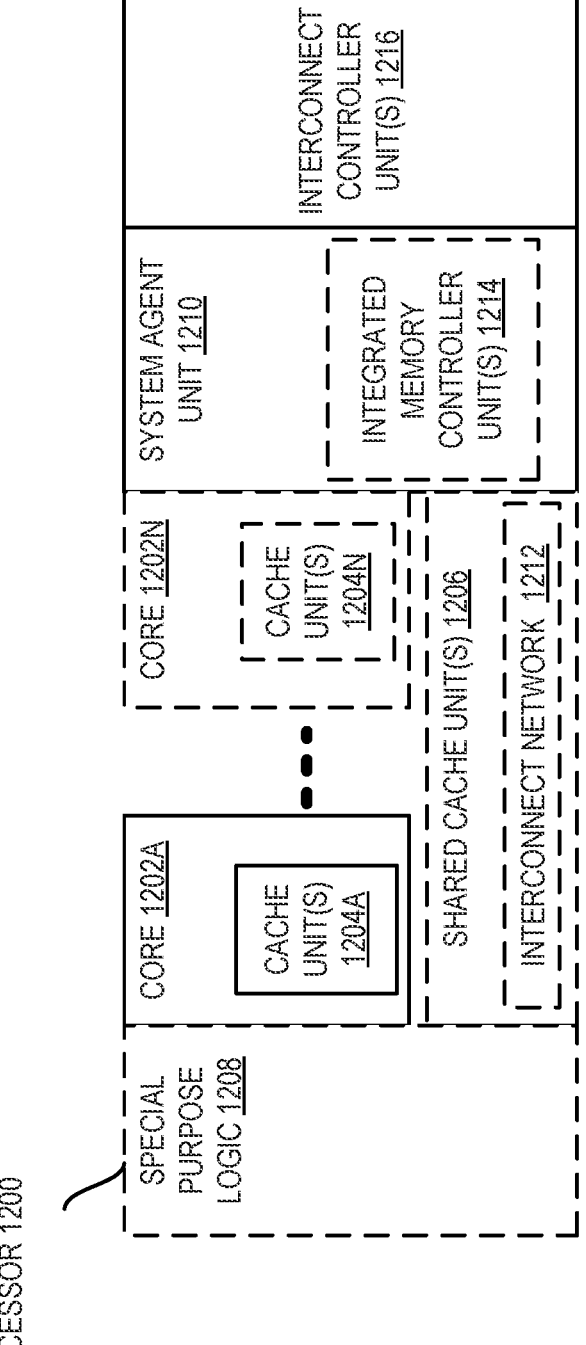
FIG. 12 illustrates a block diagram of examples of a processor that may have more than one core, may have an integrated memory controller, and may have integrated graphics.

FIG. 12 illustrates a block diagram of examples of a processor 1200 that may have more than one core, may have an integrated memory controller, and may have integrated graphics. The solid lined boxes illustrate a processor 1200 with a single core 1202A, a system agent 1210, a set of one or more interconnect controller units circuitry 1216, while the optional addition of the dashed lined boxes illustrates an alternative processor 1200 with multiple cores 1202(A)-(N), a set of one or more integrated memory controller unit(s) circuitry 1214 in the system agent unit circuitry 1210, and special purpose logic 1208, as well as a set of one or more interconnect controller units circuitry 1216. Note that the processor 1200 may be one of the processors 1170 or 1180, or co-processor 1138 or 1115 of FIG. 11.

Thus, different implementations of the processor 1200 may include: 1) a CPU with the special purpose logic 1208 being integrated graphics and/or scientific (throughput) logic (which may include one or more cores, not shown), and the cores 1202(A)-(N) being one or more general purpose cores (e.g., general purpose in-order cores, general purpose out-of-order cores, or a combination of the two); 2) a coprocessor with the cores 1202(A)-(N) being a large number of special purpose cores intended primarily for graphics and/or scientific (throughput); and 3) a coprocessor with the cores 1202(A)-(N) being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

A memory hierarchy includes one or more levels of cache unit(s) circuitry 1204(A)-(N) within the cores 1202(A)-(N), a set of one or more shared cache units circuitry 1206, and external memory (not shown) coupled to the set of integrated memory controller units circuitry 1214. The set of one or more shared cache units circuitry 1206 may include one or more mid-level caches, such as level 2 (L2), level 3 (L3), level 4 (L4), or other levels of cache, such as a last level cache (LLC), and/or combinations thereof. While in some examples ring-based interconnect network circuitry 1212 interconnects the special purpose logic 1208 (e.g., integrated graphics logic), the set of shared cache units circuitry 1206, and the system agent unit circuitry 1210, alternative examples use any number of well-known techniques for interconnecting such units. In some examples, coherency is maintained between one or more of the shared cache units circuitry 1206 and cores 1202(A)-(N).

In some examples, one or more of the cores 1202(A)-(N) are capable of multi-threading. The system agent unit circuitry 1210 includes those components coordinating and operating cores 1202(A)-(N). The system agent unit circuitry 1210 may include, for example, power control unit (PCU) circuitry and/or display unit circuitry (not shown). The PCU may be or may include logic and components needed for regulating the power state of the cores 1202(A)-(N) and/or the special purpose logic 1208 (e.g., integrated graphics logic). The display unit circuitry is for driving one or more externally connected displays.

The cores 1202(A)-(N) may be homogenous or heterogeneous in terms of architecture instruction set; that is, two or more of the cores 1202(A)-(N) may be capable of executing the same instruction set, while other cores may be capable of executing only a subset of that instruction set or a different instruction set.

Exemplary Core Architectures

In-Order and Out-of-Order Core Block Diagram

Figure 13A:
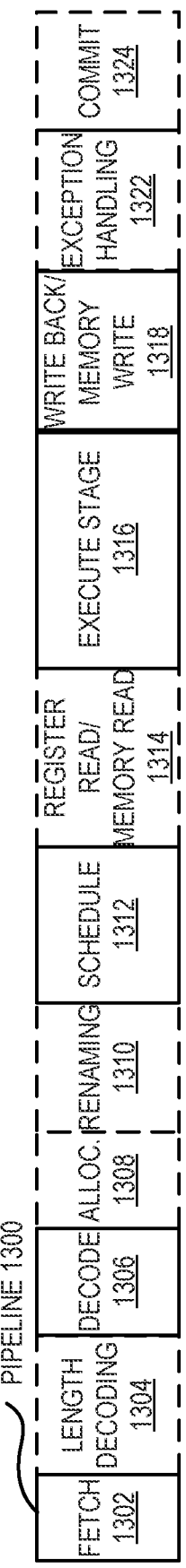
FIG. 13(A) is a block diagram illustrating both an exemplary in-order pipeline and an exemplary register renaming, out-of-order issue/execution pipeline according to examples.
Figure 13B:
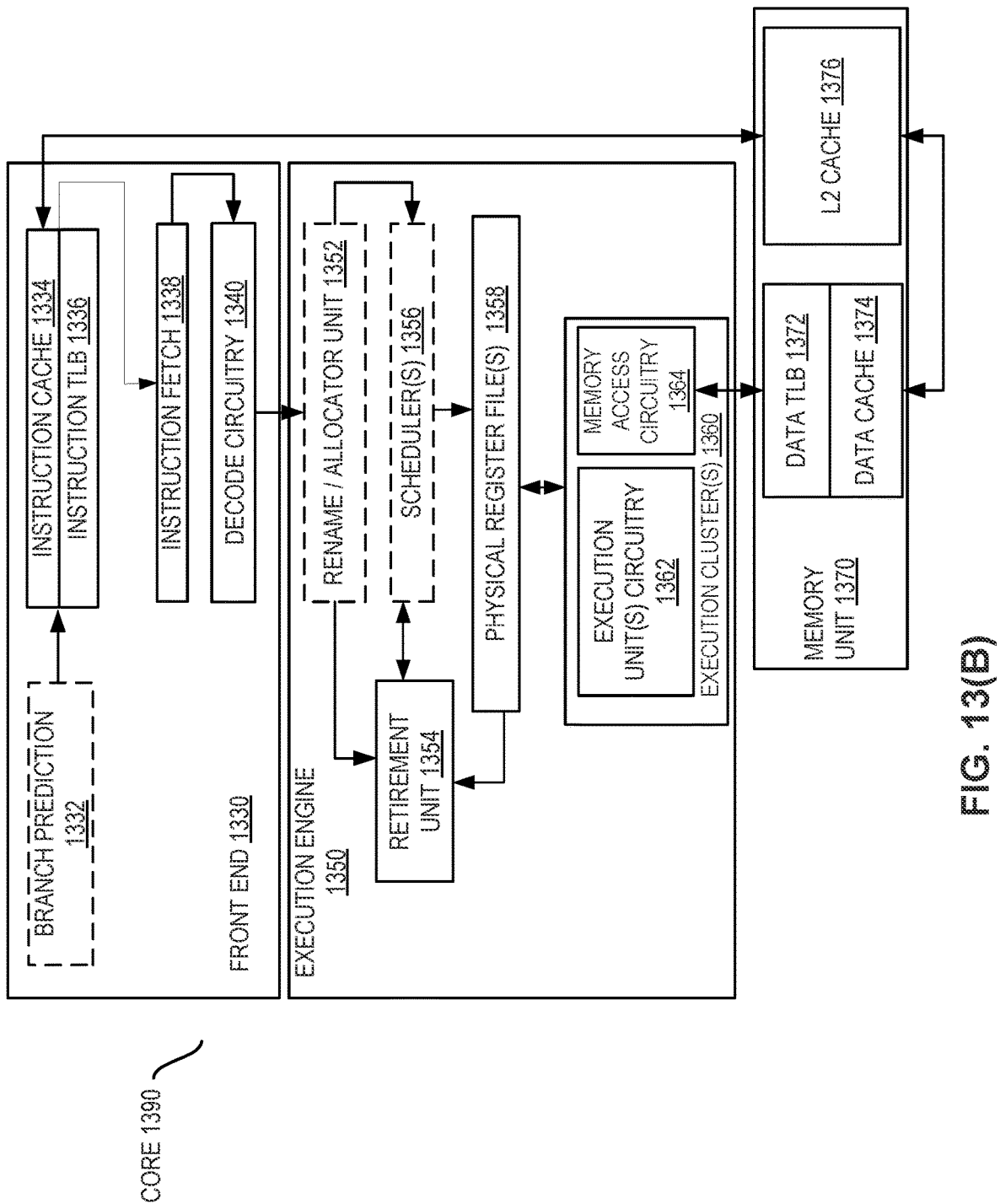
FIG. 13(B) is a block diagram illustrating both an exemplary embodiment of an in-order architecture core and an exemplary register renaming, out-of-order issue/execution architecture core to be included in a processor according to examples.

FIG. 13(A) is a block diagram illustrating both an exemplary in-order pipeline and an exemplary register renaming, out-of-order issue/execution pipeline according to examples. FIG. 13(B) is a block diagram illustrating both an exemplary embodiment of an in-order architecture core and an exemplary register renaming, out-of-order issue/execution architecture core to be included in a processor according to examples. The solid lined boxes in FIGS. 13(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13(A), a processor pipeline 1300 includes a fetch stage 1302, an optional length decode stage 1304, a decode stage 1306, an optional allocation stage 1308, an optional renaming stage 1310, a scheduling (also known as a dispatch or issue) stage 1312, an optional register read/memory read stage 1314, an execute stage 1316, a write back/memory write stage 1318, an optional exception handling stage 1322, and an optional commit stage 1324. One or more operations can be performed in each of these processor pipeline stages. For example, during the fetch stage 1302, one or more instructions are fetched from instruction memory, during the decode stage 1306, the one or more fetched instructions may be decoded, addresses (e.g., load store unit (LSU) addresses) using forwarded register ports may be generated, and branch forwarding (e.g., immediate offset or an link register (LR)) may be performed. In some examples, the decode stage 1306 and the register read/memory read stage 1314 may be combined into one pipeline stage. In some examples, during the execute stage 1316, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit circuitry 1340 performs the decode stage 1306; 3) the rename/allocator unit circuitry 1352 performs the allocation stage 1308 and renaming stage 1310; 4) the scheduler unit(s) circuitry 1356 performs the schedule stage 1312; 5) the physical register file(s) unit(s)

circuitry 1358 and the memory unit circuitry 1370 perform the register read/memory read stage 1314; the execution cluster 1360 perform the execute stage 1316; 6) the memory unit circuitry 1370 and the physical register file(s) unit(s) circuitry 1358 perform the write back/memory write stage 1318; 7) various units (unit circuitry) may be involved in the exception handling stage 1322; and 8) the retirement unit circuitry 1354 and the physical register file(s) unit(s) circuitry 1358 perform the commit stage 1324.

FIG. 13(B) shows processor core 1390 including front-end unit circuitry 1330 coupled to an execution engine unit circuitry 1350, and both are coupled to a memory unit circuitry 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit circuitry 1330 may include branch prediction unit circuitry 1332 coupled to an instruction cache unit circuitry 1334, which is coupled to an instruction translation lookaside buffer (TLB) 1336, which is coupled to instruction fetch unit circuitry 1338, which is coupled to decode unit circuitry 1340. In some examples, the instruction cache unit circuitry 1334 is included in the memory unit circuitry 1370 rather than the front-end unit circuitry 1330. The decode unit circuitry 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1340 may further include an address generation unit circuitry (AGU, not shown). In some examples, the AGU generates an LSU address using forwarded register ports, and may further perform branch forwarding (e.g., immediate offset branch forwarding, LR register branch forwarding, etc.). The decode unit circuitry 1340 may be implemented using various different mechanisms. Examples of suitable mechanisms include, but are not limited to, look-up tables, hardware implementations, programmable logic arrays (PLAs), microcode read only memories (ROMs), etc. In some examples, the core 1390 includes a microcode ROM (not shown) or other medium that stores microcode for certain macroinstructions (e.g., in decode unit circuitry 1340 or otherwise within the front end unit circuitry 1330). In some examples, the decode unit circuitry 1340 includes a micro-operation (micro-op) or operation cache (not shown) to hold/cache decoded operations, micro-tags, or micro-operations generated during the decode or other stages of the processor pipeline 1300. The decode unit circuitry 1340 may be coupled to rename/allocator unit circuitry 1352 in the execution engine unit circuitry 1350.

The execution engine circuitry 1350 includes the rename/allocator unit circuitry 1352 coupled to a retirement unit circuitry 1354 and a set of one or more scheduler(s) circuitry 1356. The scheduler(s) circuitry 1356 represents any number of different schedulers, including reservations stations, central instruction window, etc. In some examples, the scheduler(s) circuitry 1356 can include arithmetic logic unit (ALU) scheduler/scheduling circuitry, ALU queues, arithmetic generation unit (AGU) scheduler/scheduling circuitry, AGU queues, etc. The scheduler(s) circuitry 1356 is coupled to the physical register file(s) circuitry 1358. Each of the physical register file(s) circuitry 1358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In some examples, the physical register file(s) unit circuitry 1358 includes vector registers unit circuitry, writemask registers unit circuitry, and scalar register unit circuitry. These register units may provide architectural vector registers, vector mask registers, general-purpose registers, etc. The physical register file(s) unit(s) circuitry 1358 is overlapped by the retirement unit circuitry 1354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1354 and the physical register file(s) circuitry 1358 are coupled to the execution cluster(s) 1360. The execution cluster(s) 1360 includes a set of one or more execution units circuitry 1362 and a set of one or more memory access circuitry 1364. The execution units circuitry 1362 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1356, physical register file(s) unit(s) circuitry 1358, and execution cluster(s) 1360 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain examples are implemented in which only the execution cluster of this pipeline has the memory access unit(s) circuitry 1364). It should also be understood that where separate pipelines are used, one or more of these pipelines may be out-of-order issue/execution and the rest in-order.

In some examples, the execution engine unit circuitry 1350 may perform load store unit (LSU) address/data pipelining to an Advanced Microcontroller Bus (AHB) interface (not shown), and address phase and writeback, data phase load, store, and branches.

The set of memory access circuitry 1364 is coupled to the memory unit circuitry 1370, which includes data TLB unit circuitry 1372 coupled to a data cache circuitry 1374 coupled to a level 2 (L2) cache circuitry 1376. In one exemplary embodiment, the memory access units circuitry 1364 may include a load unit circuitry, a store address unit circuit, and a store data unit circuitry, each of which is coupled to the data TLB circuitry 1372 in the memory unit circuitry 1370. The instruction cache circuitry 1334 is further coupled to a level 2 (L2) cache unit circuitry 1376 in the memory unit circuitry 1370. In some examples, the instruction cache 1334 and the data cache 1374 are combined into a single instruction and data cache (not shown) in L2 cache unit circuitry 1376, a level 3 (L3) cache unit circuitry (not shown), and/or main memory. The L2 cache unit circuitry 1376 is coupled to one or more other levels of cache and eventually to a main memory.

Figure 14:
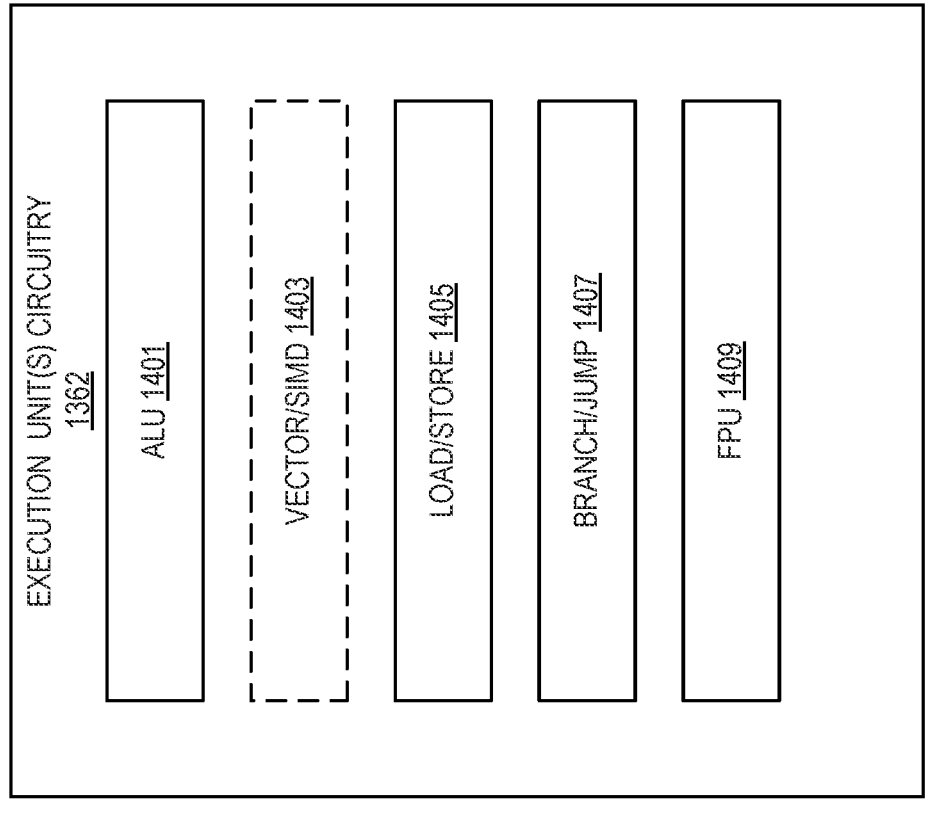
FIG. 14 illustrates examples of execution unit(s) circuitry, such as execution unit(s) circuitry of FIG. 13(B).

The core 1390 may support one or more instructions sets (e.g., the x86 instruction set (with some extensions that have been added with newer versions); the MIPS instruction set; the ARM instruction set (with optional additional extensions such as NEON)), including the instruction(s) described herein. In some examples, the core 1390 includes logic to support a packed data instruction set extension (e.g., AVX1, AVX2), thereby allowing the operations used by many multimedia applications to be performed using packed data. Exemplary Execution Unit(s) Circuitry FIG. 14 illustrates examples of execution unit(s) circuitry, such as execution unit(s) circuitry 1362 of FIG. 13(B). As illustrated, execution unit(s) circuitry 1362 may include one or more ALU circuits 1401, vector/SIMD unit circuits 1403, load/store unit circuits 1405, and/or branch/jump unit circuits 1407. ALU circuits 1401 perform integer arithmetic and/or Boolean operations. Vector/SIMD unit circuits 1403 perform vector/SIMD operations on packed data (such as SIMD/vector registers). Load/store unit circuits 1405 execute load and store instructions to load data from memory into registers or store from registers to memory. Load/store unit circuits 1405 may also generate addresses. Branch/jump unit circuits 1407 cause a branch or jump to a memory address depending on the instruction. Floating-point unit (FPU) circuits 1409 perform floating-point arithmetic. The width of the execution unit(s) circuitry 1362 varies depending upon the embodiment and can range from 16-bit to 1,024-bit. In some examples, two or more smaller execution units are logically combined to form a larger execution unit (e.g., two 128-bit execution units are logically combined to form a 256-bit execution unit). Exemplary Register Architecture FIG. 15 is a block diagram of a register architecture 1500 according to some examples. As illustrated, there are vector/SIMD registers 1510 that vary from 128-bit to 1,024 bits width. In some examples, the vector/SIMD registers 1510 are physically 512-bits and, depending upon the mapping, only some of the lower bits are used. For example, in some examples, the vector/SIMD registers 1510 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some examples, the register architecture 1500 includes writemask/predicate registers 1515. For example, in some examples, there are 8 writemask/predicate registers (sometimes called k0 through k7) that are each 16-bit, 32-bit, 64-bit, or 128-bit in size. Writemask/predicate registers 1515 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1515 corresponds to a data element position of the destination. In other examples, the writemask/ predicate registers 1515 are scalable and consists of a set number of enable bits for a given vector element (e.g., 8 enable bits per 64-bit vector element).

The register architecture 1500 includes a plurality of general-purpose registers 1525. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1500 includes scalar floating-point register 1545 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1540 (e.g., EFLAGS, RFLAGS, etc.) store status and control information for arithmetic, compare, and system operations. For example, the one or more flag registers 1540 may store condition code information such as carry, parity, auxiliary carry, zero, sign, and overflow. In some examples, the one or more flag registers 1540 are called program status and control registers.

Segment registers 1520 contain segment points for use in accessing memory. In some examples, these registers are referenced by the names CS, DS, SS, ES, FS, and GS.

Machine specific registers (MSRs) 1535 control and report on processor performance. Most MSRs 1535 handle system-related functions and are not accessible to an application program. Machine check registers 1560 consist of control, status, and error reporting MSRs that are used to detect and report on hardware errors.

One or more instruction pointer register(s) 1530 store an instruction pointer value. Control register(s) 1555 (e.g., CR0-CR4) determine the operating mode of a processor (e.g., processor 1170, 1180, 1138, 1115, and/or 1200) and the characteristics of a currently executing task. Debug registers 1550 control and allow for the monitoring of a processor or core's debugging operations.

Memory management registers 1565 specify the locations of data structures used in protected mode memory management. These registers may include a GDTR, IDRT, task register, and a LDTR register.

Alternative examples may use wider or narrower registers. Additionally, alternative examples may use more, less, or different register files and registers.
Instruction Sets An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 16:
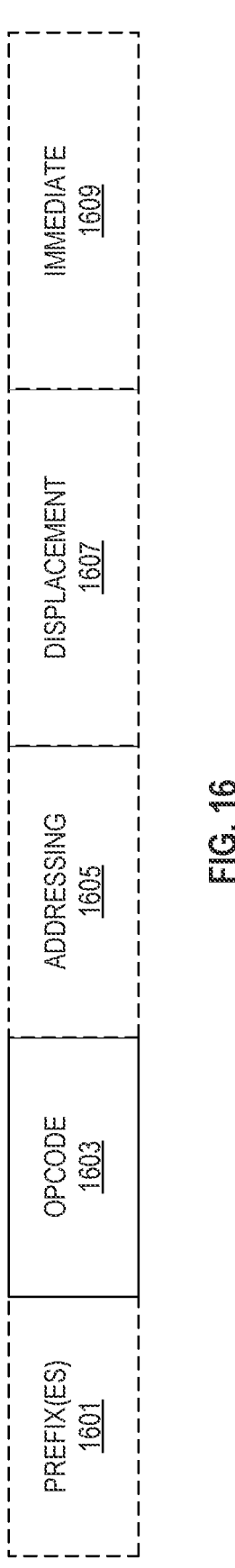
FIG. 16 illustrates examples of an instruction format.

FIG. 16 illustrates examples of an instruction format. As illustrated, an instruction may include multiple components including, but not limited to, one or more fields for: one or more prefixes 1601, an opcode 1603, addressing information 1605 (e.g., register identifiers, memory addressing information, etc.), a displacement value 1607, and/or an immediate 1609. Note that some instructions utilize some or all of the fields of the format whereas others may only use the field for the opcode 1603. In some examples, the order illustrated is the order in which these fields are to be encoded, however, it should be appreciated that in other examples these fields may be encoded in a different order, combined, etc.

The prefix(es) field(s) 1601, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1603 is used to at least partially define the operation to be performed upon a decoding of the instruction. In some examples, a primary opcode encoded in the opcode field 1603 is 1, 2, or 3 bytes in length. In other examples, a primary opcode can be a different length. An additional 3-bit opcode field is sometimes encoded in another field.

Figure 17:
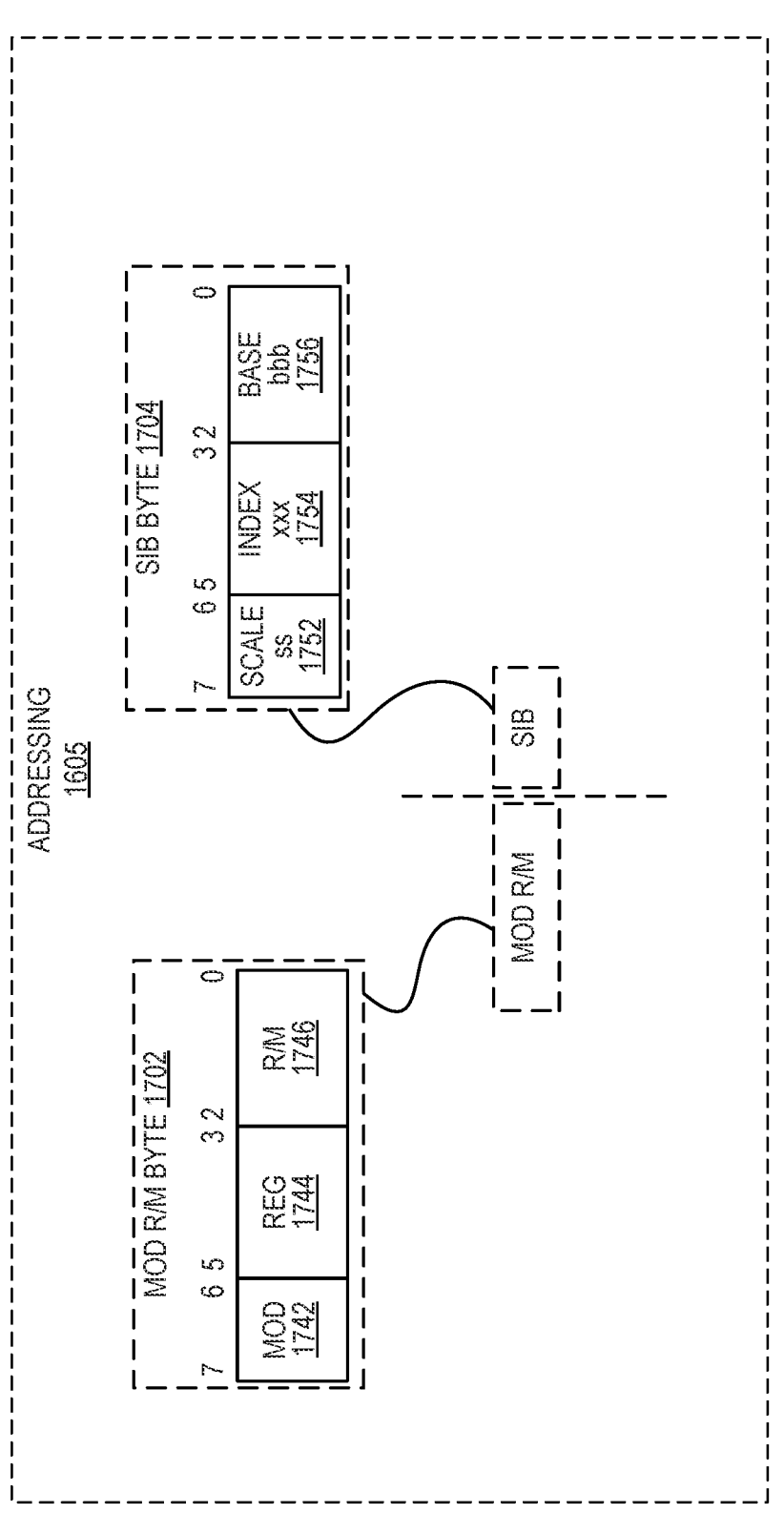
FIG. 17 illustrates examples of an addressing field.

The addressing field 1605 is used to address one or more operands of the instruction, such as a location in memory or one or more registers. FIG. 17 illustrates examples of the addressing field 1605. In this illustration, an optional ModR/M byte 1702 and an optional Scale, Index, Base (SIB) byte 1704 are shown. The ModR/M byte 1702 and the SIB byte 1704 are used to encode up to two operands of an instruction, each of which is a direct register or effective memory address. Note that each of these fields are optional in that not all instructions include one or more of these fields. The MOD R/M byte 1702 includes a MOD field 1742, a register field 1744, and R/M field 1746.

The content of the MOD field 1742 distinguishes between memory access and non-memory access modes. In some examples, when the MOD field 1742 has a value of b11, a register-direct addressing mode is utilized, and otherwise register-indirect addressing is used.

The register field 1744 may encode either the destination register operand or a source register operand, or may encode an opcode extension and not be used to encode any instruction operand. The content of register index field 1744, directly or through address generation, specifies the locations of a source or destination operand (either in a register or in memory). In some examples, the register field 1744 is supplemented with an additional bit from a prefix (e.g., prefix 1601) to allow for greater addressing.

The R/M field 1746 may be used to encode an instruction operand that references a memory address, or may be used to encode either the destination register operand or a source register operand. Note the R/M field 1746 may be combined with the MOD field 1742 to dictate an addressing mode in some examples.

The SIB byte 1704 includes a scale field 1752, an index field 1754, and a base field 1756 to be used in the generation of an address. The scale field 1752 indicates scaling factor. The index field 1754 specifies an index register to use. In some examples, the index field 1754 is supplemented with an additional bit from a prefix (e.g., prefix 1601) to allow for greater addressing. The base field 1756 specifies a base register to use. In some examples, the base field 1756 is supplemented with an additional bit from a prefix (e.g., prefix 1601) to allow for greater addressing. In practice, the content of the scale field 1752 allows for the scaling of the content of the index field 1754 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement field 1607 provides this value. Additionally, in some examples, a displacement factor usage is encoded in the MOD field of the addressing field 1605 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1607.

In some examples, an immediate field 1609 specifies an immediate for the instruction. An immediate may be encoded as a 1-byte value, a 2-byte value, a 4-byte value, etc.

FIG. 18 illustrates examples of a first prefix 1601(A). In some examples, the first prefix 1601(A) is some examples of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1601(A) may specify up to three registers using 3-bit fields depending on the format: 1) using the reg field 1744 and the R/M field 1746 of the Mod R/M byte 1702; 2) using the Mod R/M byte 1702 with the SIB byte 1704 including using the reg field 1744 and the base field 1756 and index field 1754; or 3) using the register field of an opcode.

In the first prefix 1601(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1744 and MOD R/M R/M field 1746 alone can each only address 8 registers.

In the first prefix 1601(A), bit position 2 (R) may an extension of the MOD R/M reg field 1744 and may be used to modify the ModR/M reg field 1744 when that field encodes a general purpose register, a 64-bit packed data register (e.g., a SSE register), or a control or debug register. R is ignored when Mod R/M byte 1702 specifies other registers or defines an extended opcode.

Bit position 1 (X) X bit may modify the SIB byte index field 1754.

Bit position B (B) B may modify the base in the Mod R/M R/M field 1746 or the SIB byte base field 1756; or it may modify the opcode register field used for accessing general purpose registers (e.g., general purpose registers 1525).

FIGS. 19(A)-(D) illustrate examples of how the R, X, and B fields of the first prefix 1601(A) are used. FIG. 19(A) illustrates R and B from the first prefix 1601(A) being used to extend the reg field 1744 and R/M field 1746 of the MOD R/M byte 1702 when the SIB byte 1704 is not used for memory addressing. FIG. 19(B) illustrates R and B from the first prefix 1601(A) being used to extend the reg field 1744 and R/M field 1746 of the MOD R/M byte 1702 when the SIB byte 1704 is not used (register-register addressing). FIG. 19(C) illustrates R, X, and B from the first prefix 1601(A) being used to extend the reg field 1744 of the MOD R/M byte 1702 and the index field 1754 and base field 1756 when the SIB byte 1704 being used for memory addressing. FIG. 19(D) illustrates B from the first prefix 1601(A) being used to extend the reg field 1744 of the MOD R/M byte 1702 when a register is encoded in the opcode 1603.

Figures 20A, 20B:
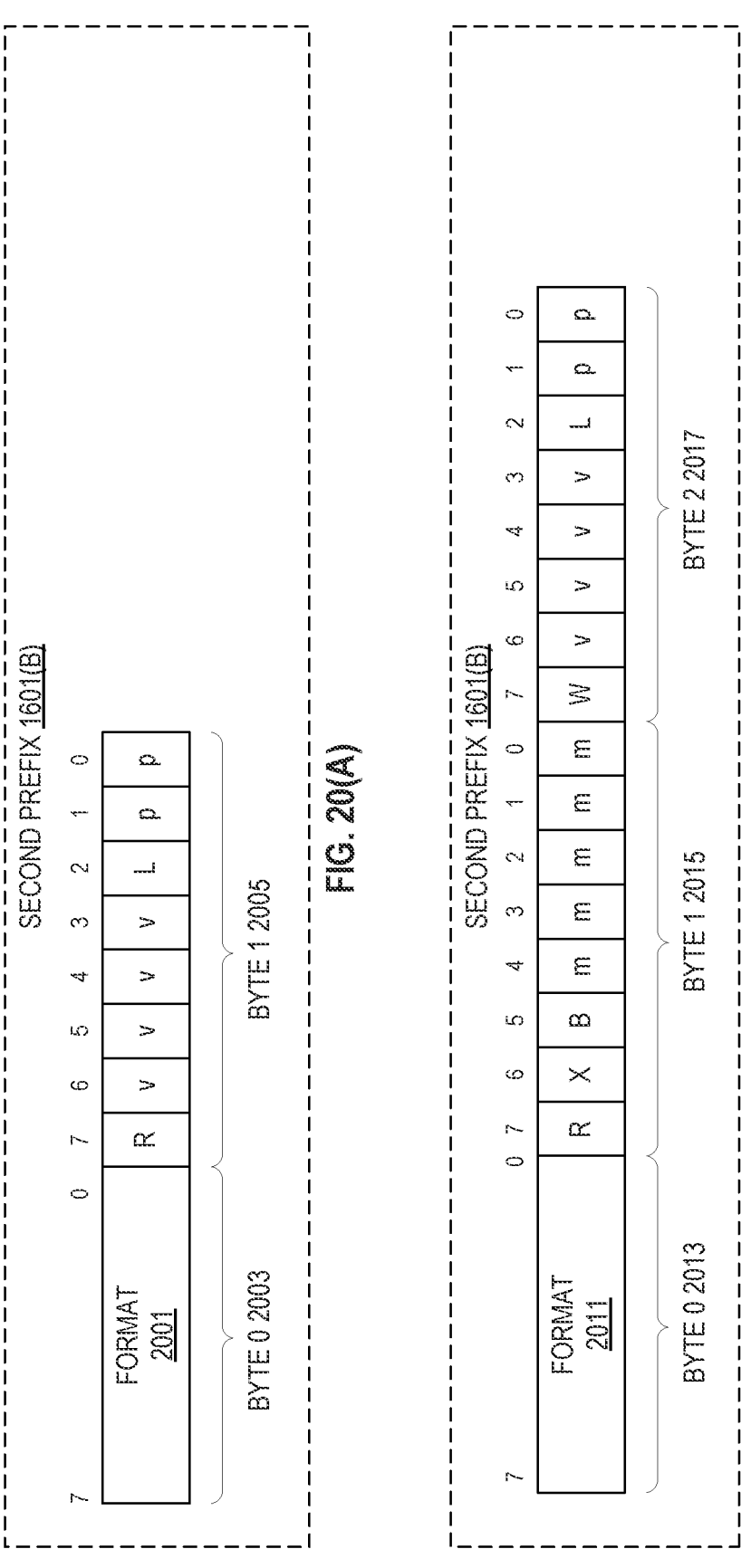
FIGS. 20(A)-(B) illustrate examples of a second prefix.

FIGS. 20(A)-(B) illustrate examples of a second prefix 1601(B). In some examples, the second prefix 1601(B) is some examples of a VEX prefix. The second prefix 1601(B) encoding allows instructions to have more than two operands, and allows SIMD vector registers (e.g., vector/SIMD registers 1510) to be longer than 64-bits (e.g., 128-bit and 256-bit). The use of the second prefix 1601(B) provides for three-operand (or more) syntax. For example, previous two-operand instructions performed operations such as A=A+B, which overwrites a source operand. The use of the second prefix 1601(B) enables operands to perform nondestructive operations such as A=B+C.

In some examples, the second prefix 1601(B) comes in two forms—a two-byte form and a three-byte form. The two-byte second prefix 1601(B) is used mainly for 128-bit, scalar, and some 256-bit instructions; while the three-byte second prefix 1601(B) provides a compact replacement of the first prefix 1601(A) and 3-byte opcode instructions.

FIG. 20(A) illustrates examples of a two-byte form of the second prefix 1601(B). In one example, a format field 2001 (byte 0 2003) contains the value C5H. In one example, byte 1 2005 includes a "R" value in bit[7]. This value is the complement of the same value of the first prefix 1601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1746 to encode the instruction operand that references a memory address or encode either the destination register operand or a source register operand.

Instructions that use this prefix may use the Mod R/M reg field 1744 to encode either the destination register operand or a source register operand, be treated as an opcode extension and not used to encode any instruction operand.

For instruction syntax that support four operands, vvvv, the Mod R/M R/M field 1746 and the Mod R/M reg field 1744 encode three of the four operands. Bits[7:4] of the immediate 1609 are then used to encode the third source register operand.

FIG. 20(B) illustrates examples of a three-byte form of the second prefix 1601(B). in one example, a format field 2011 (byte 0 2013) contains the value C4H. Byte 1 2015 includes in bits[7:5] "R," "X," and "B" which are the complements of the same values of the first prefix 1601(A). Bits[4:0] of byte 1 2015 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 2017 is used similar to W of the first prefix 1601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1746 to encode the instruction operand that references a memory address or encode either the destination register operand or a source register operand.

Instructions that use this prefix may use the Mod R/M reg field 1744 to encode either the destination register operand or a source register operand, be treated as an opcode extension and not used to encode any instruction operand.

For instruction syntax that support four operands, vvvv, the Mod R/M R/M field 1746, and the Mod R/M reg field 1744 encode three of the four operands. Bits[7:4] of the immediate 1609 are then used to encode the third source register operand.

Figure 21:
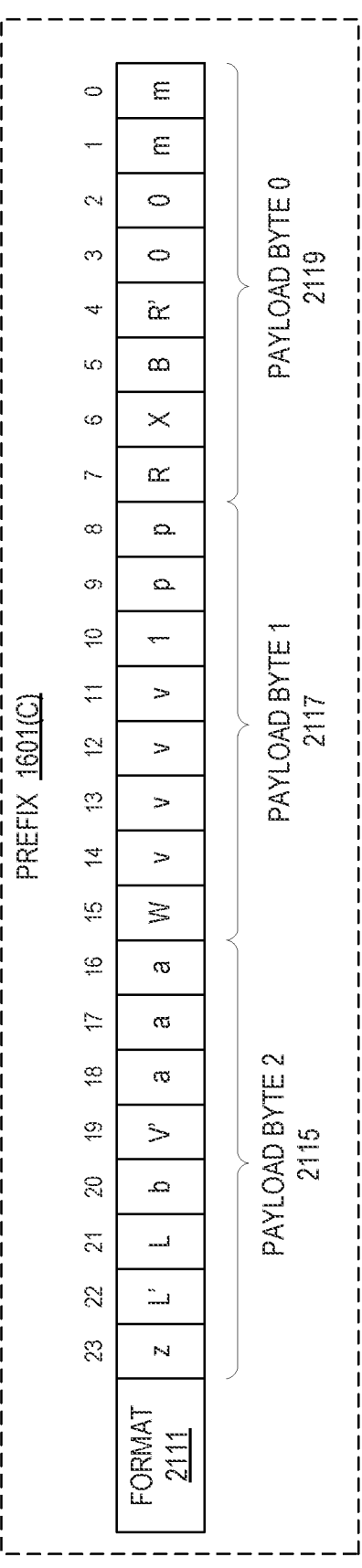
FIG. 21 illustrates examples of a third prefix.

FIG. 21 illustrates examples of a third prefix 1601(C). In some examples, the first prefix 1601(A) is some examples of an EVEX prefix. The third prefix 1601(C) is a four-byte prefix.

The third prefix 1601(C) can encode 32 vector registers (e.g., 128-bit, 256-bit, and 512-bit registers) in 64-bit mode. In some examples, instructions that utilize a writemask/ opmask (see discussion of registers in a previous figure, such as FIG. 15) or predication utilize this prefix. Opmask register allow for conditional processing or selection control. Opmask instructions, whose source/destination operands are opmask registers and treat the content of an opmask register as a single value, are encoded using the second prefix 1601(B).

The third prefix 1601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1601(C) is a format field 2111 that has a value, in one example, of 62H. Subsequent bytes are referred to as payload bytes 2115-2119 and collectively form a 24-bit value of P[23:0] providing specific capability in the form of one or more fields (detailed herein).

In some examples, P[1:0] of payload byte 2119 are identical to the low two mmmmm bits. P[3:2] are reserved in some examples. Bit P[4] (R') allows access to the high 16 vector register set when combined with P[7] and the ModR/M reg field 1744. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1744 and ModR/M R/M field 1746. P[9:8] provide opcode extensibility equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1601(A) and second prefix 1611(B) and may serve as an opcode extension bit or operand size promotion.

P[18:16] specify the index of a register in the opmask (writemask) registers (e.g., writemask/predicate registers 1515). In some examples, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other some examples, preserving the old value of each element of the destination where the corresponding mask bit has a 0. In contrast, when zeroing vector masks allow any set of elements in the destination to be zeroed during the execution of any operation (specified by the base operation and the augmentation operation); in some examples, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 1601(C) are detailed in the following tables.

TABLE 1

| 32-Register Support in 64-bit Mode | | | | | |
|---|---|---|---|---|---|
|  | 4 | 3 | [2:0] | REG. TYPE | COMMON USAGES |
| REG | R' | R | ModR/M reg | GPR, Vector | Destination or Source |
| VVVV | V' |  | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
|  | [2:0] | REG.TYPE | COMMON USAGES |
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
|  | [2:0] | REG.TYPE | COMMON USAGES |
| REG | ModR/M Reg | k0-k7 | Source |
| VVVV | vvvv | k0-k7 | 2nd Source |
| RM | ModR/M R/M | k0-7 | 1st Source |
| {k1] | aaa | k0¹-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least some examples may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
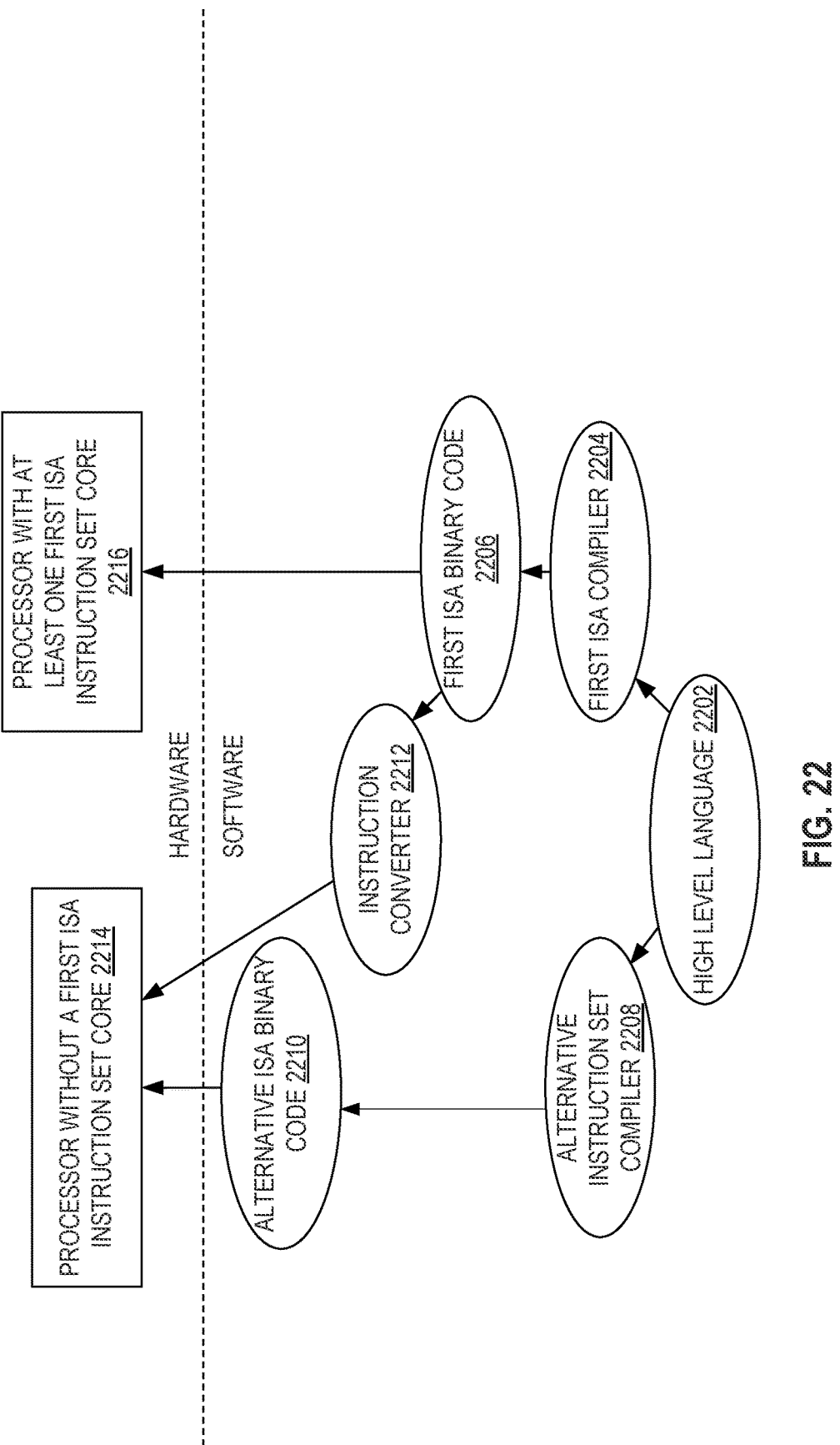
FIG. 22 illustrates a block diagram contrasting the use of a software instruction converter to convert binary instructions in a source instruction set to binary instructions in a target instruction set according to examples.

FIG. 22 illustrates a block diagram contrasting the use of a software instruction converter to convert binary instructions in a source instruction set to binary instructions in a target instruction set according to examples. In the illustrated embodiment, the instruction converter is a software instruction converter, although alternatively the instruction converter may be implemented in software, firmware, hardware, or various combinations thereof. FIG. 22 shows a program in a high level language 2202 may be compiled using a first ISA compiler 2204 to generate first ISA binary code 2206 that may be natively executed by a processor with at least one first instruction set core 2216. The processor with at least one first ISA instruction set core 2216 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 2204 represents a compiler that is operable to generate first ISA binary code 2206 (e.g., object code) that can, with or without additional linkage processing, be executed on the processor with at least one first ISA instruction set core 2216. Similarly, FIG. 22 shows the program in the high level language 2202 may be compiled using an alternative instruction set compiler 2208 to generate alternative instruction set binary code 2210 that may be natively executed by a processor without a first ISA instruction set core 2214. The instruction converter 2212 is used to convert the first ISA binary code 2206 into code that may be natively executed by the processor without a first ISA instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have a first ISA instruction set processor or core to execute the first ISA binary code 2206.

References to "some examples," "some examples," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with some examples, it is submitted that it is within the knowledge of one skilled in the art to affect such feature, structure, or characteristic in connection with other examples whether or not explicitly described.

Examples, include, but are not limited to:

1. An apparatus comprising:
   decoder circuitry to decode a single instruction, the single instruction having at least one field for an opcode, at least one field for a source operand to provide a memory address at least a byte of data, wherein the opcode is to indicate that circuitry is to fetch of a line of data from memory at the provided address that contains the byte specified with the source operand and store that byte in at least a cache local to a requester, wherein the byte of data is to be stored in a shared state; and
   execution circuitry to execute the decoded instruction according to the opcode.

2. The apparatus of example 1, wherein the opcode is to indicate the byte of data is to be stored in the shared state.

3. The apparatus of example 1, wherein a model specific register is to indicate the byte of data is to be stored in the shared state.

4. The apparatus of example 1, wherein one or more bits of an addressing field are to indicate the byte of data is to be stored in the shared state.

5. The apparatus of any of examples 1-4, wherein the field for the source operand is to identify a memory location.

6. The apparatus of any of examples 1-5, wherein the byte of data is to also be stored in a shared state in a last level cache.

7. The apparatus of any of examples 1-6, wherein the execution circuitry at least includes cache coherency circuitry.

8. An apparatus comprising:

decoding a single instruction, the single instruction having at least one field for an opcode, at least one field for a source operand to provide a memory address at least a byte of data, wherein the opcode is to indicate that circuitry is to fetch of a line of data from memory at the provided address that contains the byte specified with the source operand and store that byte in at least a cache local to a requester, wherein the byte of data is to be stored in a shared state; and executing the decoded instruction according to the opcode.

9. The method of example 8, wherein the opcode is to indicate the byte of data is to be stored in the shared state.

10. The method of example 8, wherein a model specific register is to indicate the byte of data is to be stored in the shared state.

11. The method of example 8, wherein one or more bits of an addressing field are to indicate the byte of data is to be stored in the shared state.

12. The method of any of examples 8-11, wherein the field for the source operand is to identify a memory location.

13. The method of any of examples 8-12, wherein the byte of data is to also be stored in a shared state in a last level cache.

14. The method of any of examples 8-13, wherein the executing utilizes at least cache coherency circuitry.

15. A non-transitory machine-readable medium having stored thereon at least an instance of a single instruction which when processed by a machine is to cause the machine to perform a method comprising:

decoding the instance of the single instruction, the instance of the single instruction having at least one field for an opcode, at least one field for a source operand to provide a memory address at least a byte of data, wherein the opcode is to indicate that circuitry is to fetch of a line of data from memory at the provided address that contains the byte specified with the source operand and store that byte in at least a cache local to a requester, wherein the byte of data is to be stored in a shared state; and executing the decoded instruction according to the opcode.

16. The non-transitory machine-readable medium of example 15, wherein the opcode is to indicate the byte of data is to be stored in the shared state.

17. The non-transitory machine-readable medium of example 15, wherein a model specific register is to indicate the byte of data is to be stored in the shared state.

18. The non-transitory machine-readable medium of example 15, wherein one or more bits of an addressing field are to indicate the byte of data is to be stored in the shared state.

19. The non-transitory machine-readable medium of any of examples 15-18, wherein the field for the source operand is to identify a memory location.

20. The non-transitory machine-readable medium of any of examples 15-19, wherein the byte of data is to also be stored in a shared state in a last level cache.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:

decoder circuitry to decode a single instruction, the single instruction having at least one field for an opcode, at least one field for a source operand to provide a memory address for at least a byte of data, wherein the opcode is to indicate that circuitry is to fetch of a line of data from memory at the provided address that contains the byte specified by the source operand and store that byte in a cache local to a requester and in a last level cache, wherein the byte of data is to be stored in a shared state in both the cache local to the requester and in the last level cache; and execution circuitry to execute the decoded instruction according to the opcode.

2. The apparatus of claim 1, wherein the opcode is to indicate the byte of data is to be stored in the shared state.

3. The apparatus of claim 1, wherein a configuration register is to indicate the byte of data is to be stored in the shared state.

4. The apparatus of claim 1, wherein one or more bits of an addressing field are to indicate the byte of data is to be stored in the shared state.

5. The apparatus of claim 1, wherein the field for the source operand is to identify a memory location.

6. The apparatus of claim 1, wherein the execution circuitry at least includes cache coherency circuitry.

7. A method comprising:

decoding a single instruction, the single instruction having at least one field for an opcode, at least one field for a source operand to provide a memory address for at least a byte of data, wherein the opcode is to indicate that circuitry is to fetch of a line of data from memory at the provided address that contains the byte specified by the source operand and store that byte in a cache local to a requester and in a last level cache, wherein the byte of data is to be stored in a shared state in both the cache local to the requester and in the last level cache; and executing the decoded instruction according to the opcode.

8. The method of claim 7, wherein the opcode is to indicate the byte of data is to be stored in the shared state.

9. The method of claim 7, wherein a model specific register is to indicate the byte of data is to be stored in the shared state.

10. The method of claim 7, wherein one or more bits of an addressing field are to indicate the byte of data is to be stored in the shared state.

11. The method of claim 7, wherein the field for the source operand is to identify a memory location.

12. The method of claim 7, wherein the executing utilizes at least cache coherency circuitry.

13. A non-transitory machine-readable medium having stored thereon at least an instance of a single instruction which when processed by a machine is to cause the machine to perform a method comprising:

decoding the instance of the single instruction, the instance of the single instruction having at least one field for an opcode, at least one field for a source operand to provide a memory address for at least a byte of data, wherein the opcode is to indicate that circuitry is to fetch of a line of data from memory at the provided address that contains the byte specified by the source operand and store that byte in a cache local to a requester and in a last level cache, wherein the byte of data is to be stored in a shared state in both the cache local to the requester and in the last level cache; and executing the decoded instruction according to the opcode.

14. The non-transitory machine-readable medium of claim 13, wherein the opcode is to indicate the byte of data is to be stored in the shared state.

15. The non-transitory machine-readable medium of claim 13, wherein a model specific register is to indicate the byte of data is to be stored in the shared state.

16. The non-transitory machine-readable medium of claim 13, wherein one or more bits of an addressing field are to indicate the byte of data is to be stored in the shared state.

17. The non-transitory machine-readable medium of claim 13, wherein the field for the source operand is to identify a memory location.

\* \* \* \* \*